(12) United States Patent
Faith et al.

(10) Patent No.: US 9,984,379 B2
(45) Date of Patent: *May 29, 2018

(54) DETERMINING TARGETED INCENTIVES BASED ON CONSUMER TRANSACTION HISTORY

(71) Applicant: VISA INTERNATIONAL SERVICE ASSOCIATION, San Francisco, CA (US)

(72) Inventors: Patrick Faith, Pleasanton, CA (US); Kevin P. Siegel, Mountain View, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/635,543

(22) Filed: Jun. 28, 2017

(65) Prior Publication Data

US 2017/0300940 A1 Oct. 19, 2017

Related U.S. Application Data

(63) Continuation of application No. 12/773,765, filed on May 4, 2010, now Pat. No. 9,727,868.

(Continued)

(51) Int. Cl.
*G06Q 30/02* (2012.01)
*G06F 17/30* (2006.01)
(Continued)

(52) U.S. Cl.
CPC ..... *G06Q 30/0202* (2013.01); *G06Q 30/0269* (2013.01)

(58) Field of Classification Search
USPC ........... 705/7.31, 14.53, 14.25, 14.13, 14.66, 705/14.1, 7.29, 14.41, 14.49, 14.52, 14.58
See application file for complete search history.

(56) References Cited

U.S. PATENT DOCUMENTS 4,908,761 A 3/1990 Tai
5,283,829 A 2/1994 Ander son
(Continued)

FOREIGN PATENT DOCUMENTS

KR 10-2000-0072818 12/2000
KR 10-0521752 10/2005
(Continued)

OTHER PUBLICATIONS

International Preliminary Report on Patentability dated Nov. 17, 2011, corresponding to PCT/US2010/033567, 7 pages.
(Continued)

*Primary Examiner* — Mark A Fleischer
(74) *Attorney, Agent, or Firm* — Kilpatrick Townsend & Stockton LLP

(57) ABSTRACT

Systems, apparatus, and methods for determining incentives based on consumer history. When, how, and to whom incentives are sent can be determined. For example, an incentive can be sent to a consumer to encourage a transaction at a time when the particular consumer is predisposed to initiate the transaction. Also, an incentive for a transaction can be sent to a consumer when that transaction has a high likelihood of leading to other transactions. An incentive can also be sent after a consumer initiates a transaction that is known to not have many subsequent transaction correlated to it.

40 Claims, 11 Drawing Sheets

Related U.S. Application Data

(60) Provisional application No. 61/175,381, filed on May 4, 2009.

(51) Int. Cl.
    *G06Q 20/32* (2012.01)
    *G06Q 30/00* (2012.01)

(56) References Cited

U.S. PATENT DOCUMENTS

| | | | |
|---|---|---|---|
| 5,710,578 A | 1/1998 | Beauregard et al. | |
| 5,819,226 A | 10/1998 | Gopinathan et al. | |
| 5,974,396 A | 10/1999 | Anderson et al. | |
| 6,018,723 A | 1/2000 | Siegel et al. | |
| 6,018,724 A | 1/2000 | Arent | |
| 6,119,103 A | 9/2000 | Basch et al. | |
| 6,226,624 B1 | 5/2001 | Watson et al. | |
| 6,334,110 B1 | 12/2001 | Walter et al. | |
| 6,430,359 B1 | 8/2002 | Yuen et al. | |
| 6,430,539 B1 | 8/2002 | Lazarus et al. | |
| 6,658,393 B1 | 12/2003 | Basch et al. | |
| 6,725,210 B1 | 4/2004 | Key et al. | |
| 7,039,607 B2 | 5/2006 | Watarai et al. | |
| 7,165,037 B2 | 1/2007 | Lazarus et al. | |
| 7,197,474 B1 | 3/2007 | Kitts | |
| 7,227,950 B2 | 6/2007 | Faith et al. | |
| 7,251,624 B1 | 7/2007 | Lee et al. | |
| 7,376,618 B1 | 5/2008 | Anderson et al. | |
| 7,505,931 B2 | 3/2009 | Da Silva | |
| 7,533,038 B2* | 5/2009 | Blume et al. | 705/7.31 |
| 7,630,924 B1 | 12/2009 | Collins et al. | |
| 7,653,594 B2 | 1/2010 | Davis | |
| 7,881,822 B2 | 1/2011 | Thornton et al. | |
| 8,352,315 B2 | 1/2013 | Faith et al. | |
| 8,560,449 B1 | 10/2013 | Sears | |
| 2001/0003099 A1 | 6/2001 | Von Kohorn | |
| 2001/0032878 A1 | 10/2001 | Tsiounis et al. | |
| 2002/0032609 A1* | 3/2002 | Wilkman | 705/14 |
| 2002/0035539 A1 | 3/2002 | O'Connell | |
| 2002/0042718 A1 | 4/2002 | Jett | |
| 2002/0099649 A1 | 7/2002 | Lee et al. | |
| 2002/0111907 A1 | 8/2002 | Ling | |
| 2002/0169720 A1 | 11/2002 | Wilson et al. | |
| 2002/0174222 A1 | 11/2002 | Cox | |
| 2002/0188510 A1 | 12/2002 | Arias | |
| 2003/0061172 A1 | 3/2003 | Robinson | |
| 2003/0065555 A1 | 4/2003 | von gonten et al. | |
| 2003/0177087 A1 | 9/2003 | Lawrence | |
| 2004/0034570 A1* | 2/2004 | Davis | 705/26 |
| 2004/0039676 A1 | 2/2004 | Trainer | |
| 2004/0117261 A1 | 6/2004 | Walker et al. | |
| 2004/0138958 A1 | 7/2004 | Watarai et al. | |
| 2004/0148254 A1 | 7/2004 | Hauser | |
| 2004/0167823 A1 | 8/2004 | Neely et al. | |
| 2004/0230535 A1 | 11/2004 | Binder et al. | |
| 2004/0249712 A1* | 12/2004 | Brown et al. | 705/14 |
| 2005/0080806 A1 | 4/2005 | Doganata et al. | |
| 2005/0125317 A1 | 6/2005 | Winkelman et al. | |
| 2005/0154629 A1 | 7/2005 | Matsuda et al. | |
| 2005/0197954 A1 | 9/2005 | Maitland et al. | |
| 2005/0267809 A1 | 12/2005 | Zhens | |
| 2006/0143071 A1 | 6/2006 | Hofmann | |
| 2006/0143075 A1 | 6/2006 | Carr et al. | |
| 2006/0178930 A1 | 8/2006 | Kim | |
| 2006/0195390 A1 | 8/2006 | Rusk et al. | |
| 2006/0248020 A1 | 11/2006 | Robinson | |
| 2007/0073630 A1 | 3/2007 | Green et al. | |
| 2007/0078869 A1 | 4/2007 | Carr et al. | |
| 2007/0083400 A1 | 4/2007 | Katz | |
| 2007/0094066 A1 | 4/2007 | Kumar et al. | |
| 2007/0094067 A1 | 4/2007 | Kumar et al. | |
| 2007/0100680 A1 | 5/2007 | Kumar et al. | |
| 2007/0100682 A1 | 5/2007 | Kazali | |
| 2007/0118421 A1 | 5/2007 | Oku | |
| 2007/0150601 A1 | 6/2007 | Angelica | |
| 2007/0156515 A1 | 7/2007 | Hasselback et al. | |
| 2007/0203725 A1 | 8/2007 | Jung et al. | |
| 2007/0219900 A1 | 9/2007 | MacGuire | |
| 2007/0244741 A1 | 10/2007 | Blume et al. | |
| 2007/0256124 A1 | 11/2007 | Ih et al. | |
| 2008/0021803 A1 | 1/2008 | Ahles et al. | |
| 2008/0086415 A1 | 4/2008 | Bubris et al. | |
| 2008/0172289 A1 | 7/2008 | Oh et al. | |
| 2008/0203153 A1 | 8/2008 | Ketthley | |
| 2008/0270398 A1 | 10/2008 | Landau et al. | |
| 2009/0018919 A1 | 1/2009 | Walker et al. | |
| 2009/0024444 A1 | 1/2009 | Shan | |
| 2009/0198614 A1 | 8/2009 | De Ruiter et al. | |
| 2009/0234683 A1 | 9/2009 | Anderson et al. | |
| 2010/0153241 A1 | 6/2010 | Rucker et al. | |
| 2010/0161379 A1 | 6/2010 | Bene et al. | |
| 2010/0241547 A1 | 9/2010 | Wolfson et al. | |
| 2010/0280881 A1 | 11/2010 | Faith et al. | |
| 2010/0280882 A1 | 11/2010 | Faith et al. | |
| 2010/0280927 A1 | 11/2010 | Faith et al. | |
| 2010/0280950 A1 | 11/2010 | Faith et al. | |
| 2011/0000961 A1 | 1/2011 | McNeal | |
| 2014/0006284 A1 | 1/2014 | Faith et al. | |

FOREIGN PATENT DOCUMENTS

| | | |
|---|---|---|
| KR | 10-0726621 | 6/2007 |
| WO | 95/30211 A1 | 11/1995 |
| WO | 96/36934 A1 | 11/1996 |
| WO | 00/077748 | 12/2000 |
| WO | 03/038666 | 5/2003 |
| WO | 2008-021381 | 2/2008 |

OTHER PUBLICATIONS

Final Office Action dated Oct. 12, 2012 for U.S. Appl. No. 12/773,767, filed May 4, 2012, 15 pages.
Notice of Allowance and Examiner Interview Summary dated Sep. 10, 2012 for U.S. Appl. No. 12/773,763, 13 pages.
Duhigg, "How Companies Learn Your Secrets," 2012, New York Times, 10 pages.
Final Office Action dated Dec. 7, 2012 for U.S. Appl. No. 12/773,766, filed May 4, 2010, 16 pages.
Australian Office Action dated Nov. 27, 2012, for AU Patent Application No. 2010246077, 4 pages.
Non-Final Office Action dated Sep. 2, 2011 for U.S. Appl. No. 12/773,770, filed May 4, 2010, 46 pages.
Final Office Action dated Mar. 12, 2012 for U.S. Appl. No. 12/773,770, filed May 4, 2010, 48 pages.
Non-Final Office Action dated Mar. 30, 2012 for U.S. Appl. No. 12/773,767, filed May 4, 2010, 13 pages.
International Search Report and Written Opinion dated Nov. 30, 2010 for PCT Patent Application No. PCT/US2010/033567, 10 pages.
International Search Report and Written Opinion dated Dec. 20, 2010 for PCT Patent Application No. PCT/2010/033578, 10 pages.
Non-Final Office Action dated Aug. 26, 2011 for U.S. Appl. No. 12/773,763, filed May 4, 2010, 17 pages.
Final Office Action dated Feb. 8, 2012 for U.S. Appl. No. 12/773,763, filed May 4, 2010, 22 pages.
Canadian Office Action dated May 25, 2012 for CA Patent Application No. 2,760,769, 4 pages.
Non-Final Office Action dated Mar. 30, 2012 for U.S. Appl. No. 12/773,766, filed May 4, 2010, 13 pages.
Australian Office Action dated Nov. 13, 2012, for AU Patent Application No. 2010246009, 4 pages.
Final Office Action dated Feb. 13, 2013 for U.S. Appl. No. 12/773,767, filed May 4, 2010, 15 pages.
Russian Office Action dated Apr. 23, 2013 for RU Patent Application No. 2011149335/08(074022), with English Translation, 12 pages.
Australian Notice of Acceptance dated Aug. 22, 2013 for AU Patent Application No. 2010246077, 2 pages.

(56) References Cited

OTHER PUBLICATIONS

Russian Decision on Grant dated Aug. 22, 2013 for RU Patent Application No. 2011149335/08(074022). English Translation, 10 pages.
Canadian Office Action for Canadian Patent Application No. 2,760,835. dated Oct. 21, 2013. 3 pages.
Canadian Office Action dated Jan. 8, 2014 for CA Patent Application No. 2,760,770. 2 pages.
Russian Decision to Grant dated Aug. 22, 2013 for RU Patent Application No. 2011149335/08(074022), English Translation, 10 pages.
Australian Office Action dated Aug. 21, 2013, for AU Patent Application No. 2010246009, 3 pages.
Non-Final Office Action dated Feb. 21, 2014 for U.S. Appl. No. 13/710,059, 10 pages.
Non-Final Office Action dated Apr. 14, 2014 for U.S. Appl. No. 12/773,770, 54 pages.
Cui, Geng et al.; "Data Mining in Marketing Using Bayesian Networks and Evolutionary Programming,"; E-Commerce and Intelligent Methods; edited by Segovia; Springer-Verlag; 2002; pp. 198-214.
Australian Notice of Acceptance dated Mar. 26, 2014 for AU Patent Application No. 2010246009, 2 pages.
Non-Final Office Action dated Aug. 25, 2014 for U.S. Appl. No. 12/773,770, 51 pages.
Non-Final Office Action dated Sep. 11, 2014 for U.S. Appl. No. 12/773,767, 16 pages.
Non-Final Office Action dated Sep. 17, 2014 for U.S. Appl. No. 12/773,766, 18 pages.
Final Office Action dated Oct. 6, 2014 for U.S. Appl. No. 13/710,059, 6 pages.
Final Office Action dated Dec. 10, 2014 for U.S. Appl. No. 12/773,770, 60 pages.
Non-Final Office Action dated Jan. 7, 2015 for U.S. Appl. No. 13/710,059, 6 pages.
Final Office Action dated Jan. 8, 2015 for U.S. Appl. No. 12/773,767, 16 pages.
Final Office Action dated Apr. 9, 2015 for U.S. Appl. No. 12/773,766, 25 pages.
Australian Office Action dated May 6, 2015 for AU Patent Application No. 2013267037, 4 pages.
Australian Office Action dated Aug. 25, 2015 for AU Patent Application No. 2010246085, 4 pages.
Final Office Action dated Aug. 20, 2015 for U.S. Appl. No. 13/710,059, 13 pages.

* cited by examiner

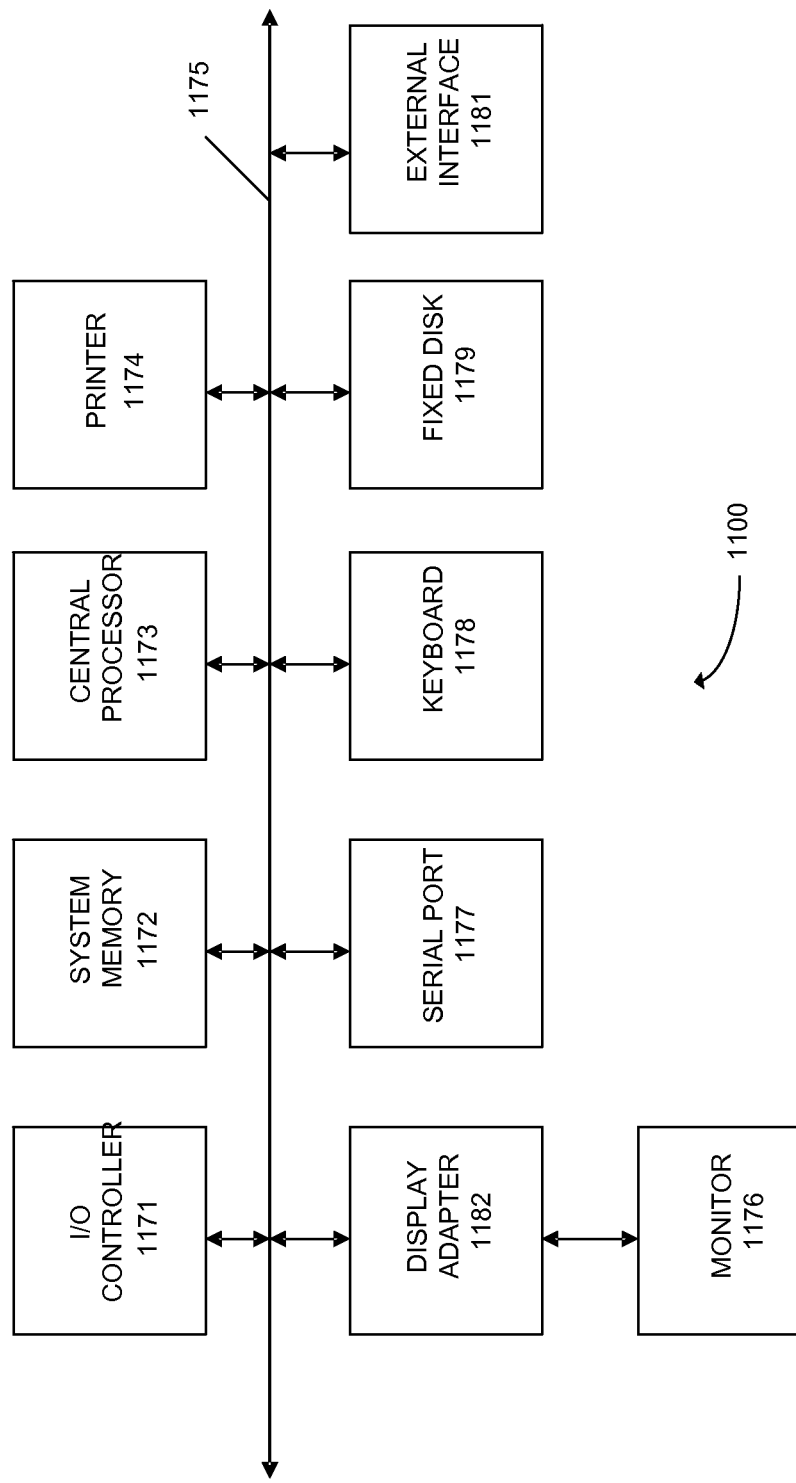

DETERMINING TARGETED INCENTIVES BASED ON CONSUMER TRANSACTION HISTORY

CROSS-REFERENCES TO RELATED APPLICATIONS

This present application is a continuation of U.S. application Ser. No. 12/773,765, entitled "DETERMINING TARGETED INCENTIVES BASED ON CONSUMER TRANSACTION HISTORY" which claims priority from and is a non provisional application of U.S. Provisional Application No. 61/175,381, entitled "SYSTEMS AND METHODS FOR DETERMINING AUTHORIZATION, RISK SCORES, AND PREDICTION OF TRANSACTIONS" filed May 4, 2009, the entire contents of which are herein incorporated by reference for all purposes.

This application is related to commonly owned and concurrently filed U.S. patent application Ser. No. 12/773,763, filed on May 4, 2010, entitled "PRE-AUTHORIZATION OF A TRANSACTION USING PREDICTIVE MODELING," by Faith et al., U.S. patent application Ser. No. 12/773,766, filed on May 4, 2010, entitled "DEMOGRAPHIC ANALYSIS USING TIME-BASED CONSUMER TRANSACTION HISTORIES," by Faith et al., U.S. patent application Ser. No. 12/773,767, filed May 4, 2010, entitled "TRANSACTION AUTHORIZATION USING TIME-DEPENDENT TRANSACTION PATTERNS," by Faith et al., and U.S. patent application Ser. No. 12/773,770, filed May 4, 2010 "FREQUENCY-BASED TRANSACTION PREDICTION AND PROCESSING" by Faith et al., the entire contents of which are herein incorporated by reference for all purposes.

BACKGROUND

The present application is generally related to tracking and processing consumer transactions, and more specifically to using a history of consumer activity in determining incentives to send to consumers.

Manufacturer, retailers, or other sellers of products (e.g. goods and services) services spend a lot of time and money trying to devise ways to get a consumer to buy their products. For example, companies advertise, send incentives for discounts, offer rewards, and other incentives to get consumers initiate a transaction for the products. However, these efforts are typically provided to the public at large, or at least a relatively large group of consumers, which can result in a high cost and a low return. Also, the timing of any efforts are typically based on when the seller wants to send an incentive, with the seller having no insight as to a beneficial time or manner to send an incentive.

Therefore, it is desirable to provide improved methods of sending incentives to a consumer, which can increase a return rate on the incentive and reduce overall cost.

BRIEF SUMMARY

Embodiments provide systems, apparatus, and methods for determining incentives based on consumer history. Certain embodiments can help to determine when, how, and to whom incentives should be sent. For example, some embodiments can determine when a particular consumer is likely to initiate a transaction, and send an incentive to the consumer to encourage the transaction to actually occur. In this manner, the incentive can be sent at a time that is likely to have an effect, and not when the consumer is unlikely to perform the transaction, thereby increasing the rate of return. Other embodiments can send an incentive for a transaction type to a consumer when that transaction type has a high likelihood of leading to other transactions (called a gateway). Yet other embodiments send an incentive after a consumer initiates a transaction (called a dead end) that is known to not have many subsequent transaction correlated to it.

According to one embodiment, a method of providing an incentive to a consumer is provided. Data corresponding to previous transactions, which can be associated with the consumer and/or similar consumer, are received. A computing system determines a pattern of the previous transactions. Based on the determined pattern of the previous transactions, a likelihood for the future transaction is determined at a plurality of times. A time window when the consumer is likely to initiate a future transaction is predicted using the likelihoods at the plurality of times. An incentive associated with the future transaction is sent to the consumer such that the consumer receives the incentive at a time correlated with the predicted time window.

According to another embodiment, a computer system determines a likelihood of any transaction occurring after a first type of transaction initiated by the consumer. An incentive for a future transaction of the first type is sent to the consumer based on the likelihood being greater than a threshold.

According to yet another embodiment, a computer system determines an amount of transactions that are correlated to a first transaction type and that occur after the first transaction type. After a transaction of the first transaction type occurs, an incentive for any transaction is sent based on the amount being below a threshold.

Other embodiments of the invention are directed to systems, computer apparatuses, portable consumer devices, and computer readable media associated with methods described herein.

As used herein, an "incentive" can be any data or information sent to a consumer to encourage a transaction. For example, a coupon can be sent to a consumer as an incentive since the consumer can obtain a better transaction price. As another example, an advertisement can be sent to a consumer to encourage a transaction by making the consumer aware of a product or service. Other example of incentives can include rewards for making a transaction and preferential treatment when making the transaction.

A better understanding of the nature and advantages of the present invention may be gained with reference to the following detailed description and the accompanying drawings.

BRIEF DESCRIPTION OF THE DRAWINGS

FIG. 11 shows a block diagram of an example computer system usable with systems and methods according to embodiments of the present invention.

DETAILED DESCRIPTION

Incentives (e.g. coupons) are often sent to large groups and are not tailored to specific individuals who are likely to act on the incentive, and thus resources can be wasted. For example, many of the people may never buy certain products, and thus incentives should not be expended on such individuals. Moreover, even if a consumer is inclined to act on the incentive, the incentive might be sent at an inopportune time. Furthermore, if a consumer is inundated or receives incentives at random times, the consumer might get irritated. Accordingly, embodiments provide systems, apparatus, and methods for determining incentives based on consumer history. For example, embodiments can help to determine when, how, and to whom incentives should be sent.

Some embodiments can determine when a particular consumer is likely to initiate a transaction, and send an incentive to the consumer to encourage the transaction to actually occur. In this manner, the incentive can be sent at a time that is likely to have an effect, and not when the consumer is unlikely to perform the transaction, thereby increasing the rate of return. Other embodiments can send an incentive for a transaction type to a consumer when that transaction type has a high likelihood of leading to other transactions (called a gateway). Yet other embodiments send an incentive after a consumer initiates a transaction (called a dead end) that is known to not have many subsequent transactions correlated to it.

I. System Overview

Figure 1:
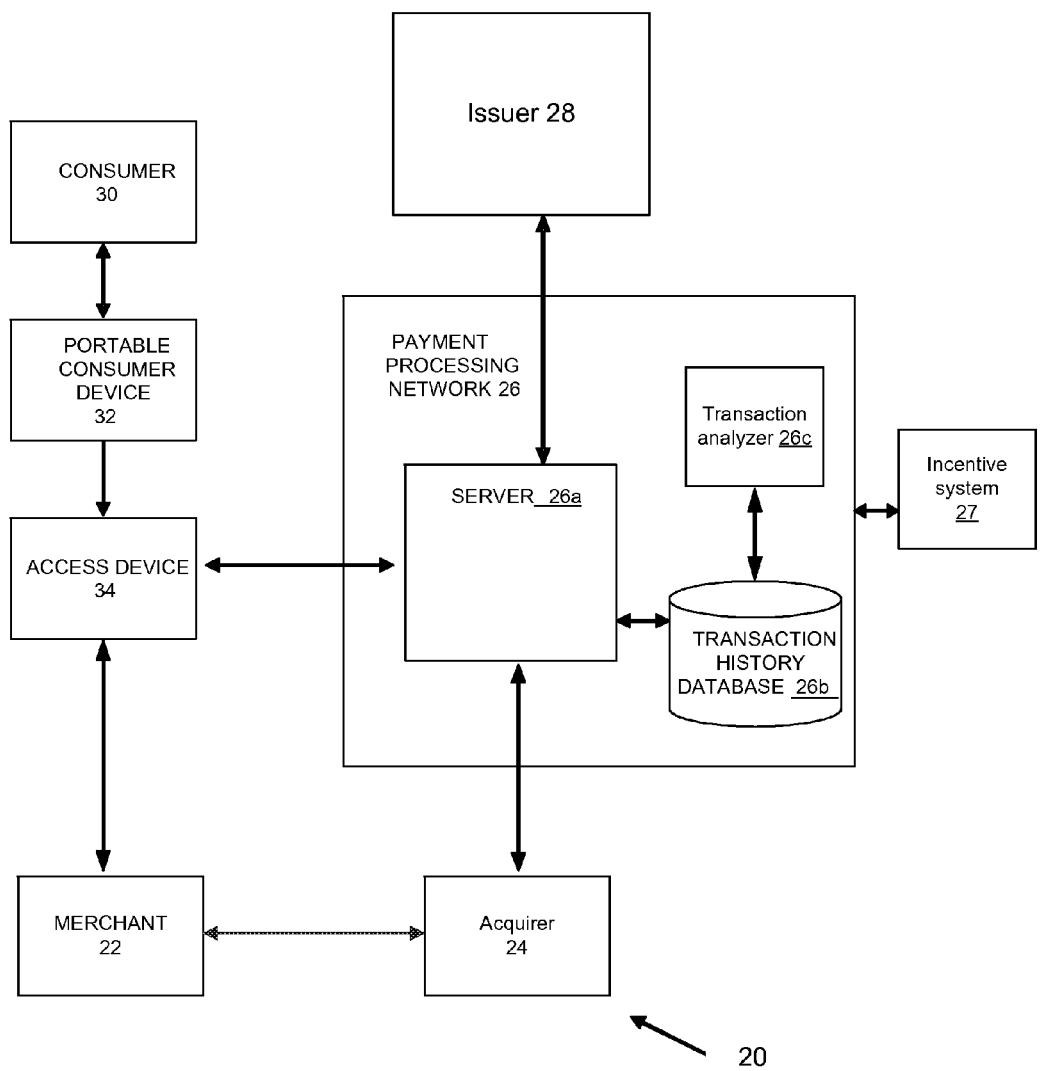
FIG. 1 shows a block diagram of a system according to an embodiment of the invention.

FIG. 1 shows an exemplary system 20 according to an embodiment of the invention. Other systems according to other embodiments of the invention may include more or less components than are shown in FIG. 1.

The system 20 shown in FIG. 1 includes a merchant 22 and an acquirer 24 associated with the merchant 22. In a typical payment transaction, a consumer 30 may purchase goods or services at the merchant 22 using a portable consumer device 32. The merchant 22 could be a physical brick and mortar merchant or an e-merchant. The acquirer 24 can communicate with an issuer 28 via a payment processing network 26. The merchant 22 could alternatively be connected directly to the payment processing network 26. The consumer may interact with the payment processing network 26 and the merchant through an access device 34.

As used herein, an "acquirer" is typically a business entity, e.g., a commercial bank that has a business relationship with a particular merchant or an ATM. An "issuer" is typically a business entity (e.g., a bank) which issues a portable consumer device such as a credit or debit card to a consumer. Some entities can perform both issuer and acquirer functions. Embodiments of the invention encompass such single entity issuer-acquirers.

The consumer 30 may be an individual, or an organization such as a business that is capable of purchasing goods or services. In other embodiments, the consumer 30 may simply be a person who wants to conduct some other type of transaction such as a money transfer transaction or a transaction at an ATM.

The portable consumer device 32 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

The merchant 22 may also have, or may receive communications from, an access device 34 that can interact with the portable consumer device 32. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device 34 is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with the portable consumer devices 32.

The access device 34 may also be a wireless phone. In one embodiment, the portable consumer device 32 and the access device are the same device. For example, a consumer may use a wireless to phone to select items to buy through a browser.

When the access device 34 is a personal computer, the interaction of the portable consumer devices 32 may be achieved via the consumer 30 or another person entering the credit card information into an application (e.g. a browser) that was opened to purchase goods or services and that connects to a server of the merchant, e.g. through a web site. In one embodiment, the personal computer may be at a checkout stand of a retail store of the merchant, and the application may already be connected to the merchant server.

The portable consumer device 32 may further include a contactless element, which is typically implemented in the form of a semiconductor chip (or other data storage element) with an associated wireless transfer (e.g., data transmission) element, such as an antenna. Contactless element is associated with (e.g., embedded within) portable consumer device 32 and data or control instructions transmitted via a cellular network may be applied to contactless element by means of a contactless element interface (not shown). The contactless element interface functions to permit the exchange of data and/or control instructions between the mobile device circuitry (and hence the cellular network) and an optional contactless element.

The portable consumer device 32 may also include a processor (e.g., a microprocessor) for processing the functions of the portable consumer device 32 and a display to allow a consumer to see phone numbers and other information and messages.

If the portable consumer device is in the form of a debit, credit, or smartcard, the portable consumer device may also optionally have features such as magnetic strips. Such devices can operate in either a contact or contactless mode.

Referring again to FIG. 1, the payment processing network 26 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 26 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet.

As shown in FIG. 1, the payment processing network 26 may comprise a server 26a, which may be in communication with a transaction history database 26b. In various embodiments, a transaction analyzer 26c can determine patterns in transactions stored in transaction history database 26b to determine certain actions, such as authorizing a transaction or sending an incentive. In one embodiment, an incentive system 27 is coupled with or part of payment processing network 26 and can be used to determine an incentive based on determined transaction patterns. Each of these apparatus can be in communication with each other. In one embodiment, all or parts of transaction analyzer 26c and/or transaction history database 26b may be part of or share circuitry with server 26a.

The issuer 28 may be a bank or other organization that may have an account associated with the consumer 30. The issuer 28 may operate a server which may be in communication with the payment processing network 26.

Embodiments of the invention are not limited to the above-described embodiments. For example, although separate functional blocks are shown for an issuer, payment processing network, and acquirer, some entities perform all or any suitable combination of these functions and may be included in embodiments of invention. Additional components may also be included in embodiments of the invention.

II. Identifying Patterns

Consumer activity can include transactions, among other things. Knowledge of a pattern of transactions of a consumer can allow identification of opportunities to incentivize continuing or new behavior of a consumer, as well as provide other advantages. However, the identification of a pattern can be difficult given the enormous amount of data, some of which might exhibit patterns and some of which may not.

As used herein, the term "pattern" refers broadly to a behavior of any set of events (e.g. transactions) that have a likelihood of repeating. In one aspect, the likelihood can be greater than a random set of events, e.g., events that are uncorrelated. The likelihood can be expressed as a probability (e.g. as a percentage or ratio), a rank (e.g. with numbers or organized words), or other suitable values or characters. One type of pattern is a frequency-based pattern in which the events repeats with one or more frequencies, which may be predefined. To define a pattern, a reference frame may be used. In various embodiments, the reference frame may be or include an elapsed time since a last event (e.g. of a type correlated to the current event), since a beginning of a fixed time period, such as day, week, month, year, . . . (which is an example of a starting event), before an end of a fixed time period, or before occurrence of a scheduled event (an example of an ending event). Another event can be certain actions by the consumer, such as traveling to a specific geographic location or browsing a certain address location on the Internet.

Figure 2:
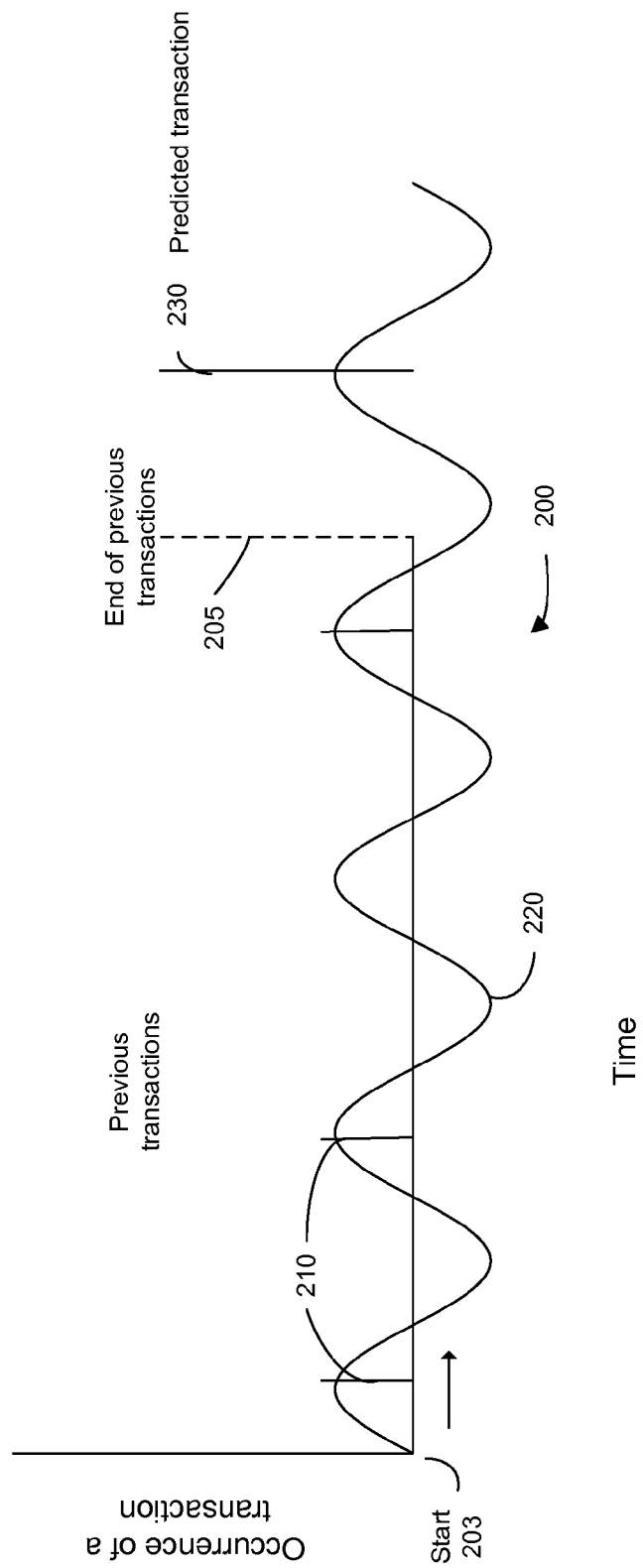
FIG. 2 shows a plot of a transaction history or other events of a consumer as analyzed according to embodiments of the present invention.

FIG. 2 shows a plot 200 of a transaction history or other events of a consumer as analyzed according to embodiments. Plot 200 shows times at which each of a plurality of previous transactions 210 have occurred. As shown, time is an absolute time (e.g. date and time) or an elapsed time since an initial event 203. Herein, the term "time" can refer to either or both a date and a time of a particular day. These previous transactions 210, which occur before an end time 205, can be analyzed to determine a pattern 220, which can be a function that approximates when the transactions are likely to occur. As an example, an identified pattern can be used to predict a likelihood of a next transaction, e.g. transaction 230.

As shown, the previous transactions do not always correspond with pattern 220. For example, the third peak of pattern 220 is missing a transaction. This example provides one instance where a likelihood of a transaction is determined, but an incentive to have the transaction continue might be desired.

The identification of a pattern can have many difficulties. If the previous transactions 210 include all of the transactions of a consumer and exhibit only one pattern, then the identification of a pattern may be relatively easy. However, if only certain types of transactions for a consumer show a pattern, then the identification can be more difficult. Some embodiments can use keys (K1, K2, . . . ) to facilitate the analysis of certain types of transactions, where a key can correspond to a type of transaction. A key can also allow identification of transactions as being relevant for a current task (e.g. the key being associated with a transaction to be incentivized).

Adding to the complexity can be whether the path to a particular transaction has an impact on the pattern, e.g., a pattern that exists only when certain transactions precede or follow a transaction. Embodiments can store transaction data associated with a specific order of keys (e.g. K1, K3). In this manner, the data for that specific order can be analyzed to determine the pattern. The order of keys also allows the further identification of relevant transactions.

All of this complexity can be further compounded in instances where a certain path (sequence of two or more transactions) can have more than one pattern. Embodiments can use certain functional forms to help identify different patterns. In some embodiments, a combination of periodic functions are used, e.g., $e^{-iwt}$, where w is a frequency of a pattern. In one embodiment, the frequencies are pre-selected thereby allowing an efficient determination of the patterns. Further, the frequencies can be identified by an associated wavelength, or wavelength range. Counters can be used for each wavelength range, thereby allowing a pattern to be very quickly identified by analyzing the values of the counters.

III. Sending an Incentive when a Transaction is Likely

Incentives (such as coupons) can be an effective way of increasing a likelihood that a consumer buys a product. However, incentives are normally sent at times that are not related to when a consumer might actually be looking to buy a product. If a consumer were to receive a incentive just before he/she is going to make a purchase, the likelihood of the use of that incentive is much greater. However, if the consumer receives an incentive when the transaction is not likely (e.g. an item is not needed), then the consumer's use of the incentive (i.e. an actual transaction) can be low.

Figure 3:
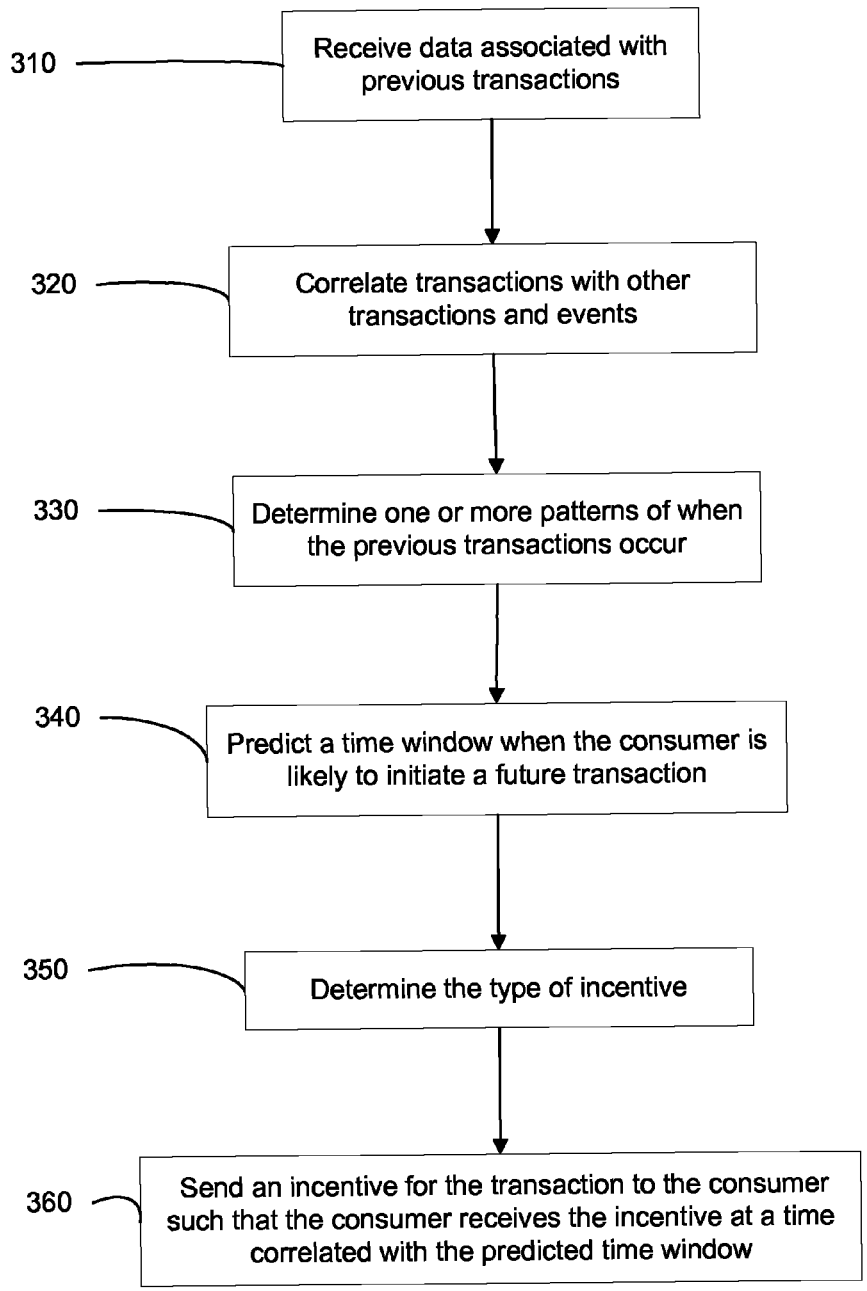
FIG. 3 is a flowchart of a method for providing an incentive to a consumer according to an embodiment of the present invention.

FIG. 3 is a flowchart of a method 300 for providing an incentive to a consumer according to embodiments. In one embodiment, previous transactions (e.g. 210) are used to determine when, how, and what incentives are to be provided. In one implementation, transactions within a specific time period are analyzed, e.g., last year or all transactions before an end time. The transactions can also be filtered based on certain criteria, such that only certain types of transactions are analyzed. The transaction history can include valid and fraudulent transactions. All or parts of method 300 or other methods herein can be performed by a computer system that can include all or parts of network 26; such a system can include disparate subsystems that can exchange data, for example, via a network, by reading and writing to a same memory, or via portable memory devices that are transferred from one subsystem to another.

In step 310, data associated with transactions previously performed (e.g. by the consumer or other consumers) is received. For example, the data in the transaction history database 26(b) can be received at a transaction analyzer 26(c) of system 20 in FIG. 1, which includes a processor that may be configured with software. Each transaction can have any number of pieces of data associated with it. For example, the data may include categories of an account number, amount of the transaction, a time and date, type or name of product or service involved in the transaction, merchant name or code (mcc), industry code, terminal field (whether a card is swiped), and geographic location (country, zip code, . . . ). In one embodiment, a merchant could be a whole chain or a particular store of a chain. In some embodiments, the transaction data can also include video and/or audio data, e.g., to identify a person or a behavior of a person. The transaction data can be different for each transaction, including the account number. For example, the consumer can be identified with the account number and other account numbers of the consumer can be included in the analysis of the behavior of the consumer.

This data can be used to identify a particular type of transaction. In one embodiment, the data for a transaction is parsed to identify one or more keys, which are used as identifiers for a particular transaction. In various embodiments, a key can includes parts of the transaction data and/or data derived from the transaction data. A key could also be composed of results from an analysis of a transaction, e.g., whether the transaction is a card-present transaction or a card-not-present transaction could be determined from the transaction data and included in the key. In one embodiment, a mapping module can perform the mapping of the transaction data to one or more keys.

A key can be composed of multiple pieces of data (referred to herein as a key element). A longer key has more key elements and may be a more selective identifier of a type of transactions. Each transaction can be associated with different keys, each with a different scope of specificity for characterizing the transaction.

In step 320, transactions are optionally correlated with other transactions and events. In this manner, different transaction patterns can be identified for different types of transactions. Other events (e.g. start or end of a day, week, etc.) can be correlated to transactions as well. An event can also be a movement of the consumer from one state to another (e.g. from an at-home state to an on-vacation state). Different events can also be identified with keys. Herein, examples are used to described how keys are used to identify transaction types, but other suitable methods can be used.

In one embodiment, pairs of correlated keys (e.g. a key pair <KI:KF>) are determined based on whether transactions associated with an initial key (KI) are correlated with transactions with a final a final key (KF). A first (initial) event can be correlated with a later (final) transaction. The initial key and the final key may be the same or different from each other. For example, a transaction at one merchant may be correlated to a later purchase at another merchant, which might occur if the merchants are near to each other. In one embodiment, a group of more than two keys could be correlated together, e.g. a group of three keys can be correlated.

Two transactions can be correlated in multiple ways depending on how many keys are associated with each transaction. Thus, two transactions can contribute to more than one key pair, when the transactions are associated with multiple keys. For example, if an initial transaction is associated with two keys and the final transaction is also associated with two keys, then there could be four resulting key pairs. Also, a transaction may be correlated to another transaction only via certain keys.

In step 330, one or more patterns of when the previous transactions occur are determined with a computer system, e.g., the transaction analyzer 26(c), which can be a subsystem or one apparatus. The patterns can convey the likelihood of a transaction as a function of time. For example, pattern 220 conveys that transactions are likely when the function has a higher value.

In one embodiment, pairs of correlated transactions (or other events) are used to determine a pattern, e.g., as times of final transactions related to initial events. The times can be stored as an absolute time and/or date for each transaction (e.g. in chronological order) or organized as elapsed times for correlated events of certain key pairs. The elapsed time may be the time between a transaction with K1 and the next transaction with K2 for the correlated <K1:K2> pair. Other data can be stored as well, e.g. data not included in the keys, such as an amount of the transaction. The elapsed time can effectively equal an absolute time if the initial event is the beginning of a time period.

In some embodiments, the time information is stored (e.g. in transaction history database 26b) associated with the corresponding key pair. For example, a key pair identifier (e.g. a unique ID number) can be associated with the stored time information. As examples of an association, a key pair identifier could point to the time information, the time information could be stored in a same row as the key pair identifier, and the key pair identifier could be stored associated with the pointer.

In other embodiments, the time information for the key pair <K1:K2> can be stored in a database table that can be accessed with a query containing K1, K2, or the combination (potentially in the order of K1:K2). For example, a search for K1 and/or K2 can provide the associated identifiers. In one embodiment, a hash of each key of a pair is also associated with the key pair identifier, so that information for each key can be indexed and found separately. For example, hashes of K1 and K2 can be stored in a lookup table so the key pair identifiers (and thus the key pair information) can be easily found.

In one aspect, storing time information in association with certain key pairs can allow the time information for specific types of transactions to be easily accessed. Also, such organization can provide easier analysis of the data to identify patterns for specific key pairs. The occurrences of the transaction can then be analyzed (e.g. Fourier analysis or other functional analysis) to identify a pattern of the times and dates of these transactions.

In step 340, a time window when the consumer is likely to initiate a future transaction is predicted based on the determined patterns. The time window may be specified in any number of ways. For example, the time window may specify a start date/time and an end date/time. In some embodiments, the patterns of the previous transactions are used to determine a likelihood for the future transaction at a plurality of times. The time window can be identified by analyzing the consumer's transaction pattern to determine times with a desirable level of likelihood for a transaction to occur. In such embodiments, the time window can be obtained with greater accuracy since a plurality of times are used. Aldo, one can be more likely to identify a time window having a desirable level of likelihood since multiple times are analyzed.

In one embodiment, the likelihood is for any transaction by the consumer, and thus the entire transaction history can be used. In another embodiment, the likelihood is for a particular transaction. When a particular transaction is being investigated, the relevant pattern can be found by querying a database using the key(s) of the particular transaction.

A pattern can have certain indicia that can be analyzed to determine likelihoods at different times. In various embodiments, the indicia may be a number of transactions in a time range, the probability at a given point in time (e.g., as calculated from a value of the pattern function at the point in time), or other measure related to likelihood. In one aspect, the time window can be measured relative to a time when the analysis is being done (e.g. at the end time 205).

In one embodiment, the time window is determined from when the pattern shows a likelihood above a threshold value. In another embodiment, the desired time window may be when the transaction is likely, but too likely (e.g. medium likely), because if there is a very high likelihood then an incentive may not be needed. Also, one may not want the likelihood to be too low as then the incentive may have a small chance of being used. In these and other embodiments, the duration of the time window can be variable (i.e. no predetermined) duration. For instance, the duration of the time window can be based on the likelihood values (e.g. the times when the likelihood rises above and falls below the threshold.

In some embodiments, the indicia of the relevant pattern can be input into a modeling function as part of the determination of the time window. In various implementations, the modeling function can be an optimization function (e.g. a neural network) or can be a decision tree (e.g. composed of IF THEN logic that compares the indicia to one or more cutoff values). In one embodiment, an optimization function can be trained on previous transactions, and thus can determine how much a transaction (e.g. at various times) fits the pattern of a particular entity (e.g. a consumer or merchant). In another embodiment, the number of keys associated with the transaction relates to the number of inputs into the modeling function. The relationship is not necessarily one-to-one as similar keys (e.g. ones of a same category) may be combined (e.g. same key elements, but just different values), but there may be a correspondence between the number of different types of keys and the number of inputs.

The time window for a first consumer can also be based on the transaction activity of other consumers, or in place of the transaction activity of the first consumer. For example, the incentive could also be sent at a particular time that a transaction for such a product is predicted for a similar consumer, and thus can be likely for the first consumer. Such a strategy may be employed when data for the first consumer is limited and does not yet show the particular pattern.

In an embodiment using other consumers, the first consumer can be determined to be similar to an affinity group (group of similar consumers). In one aspect, consumers can be similar to an affinity group with varying degrees of similarity (e.g. by percentage of similarity). In one embodiment, a likely time window can correspond to when a corresponding affinity group has a high likelihood for the transaction at a specific time, but the consumer does not show any pattern for the transaction or has a relatively low likelihood at the specific time (but potentially high at other times). In another embodiment, the optimization algorithm mentioned above can also be trained using previous patterns from multiple entities.

Referring back to method 300, in step 350, a type of incentive to encourage a transaction is determined. The incentive may, for example, be for a specific merchant, a specific type of merchant (e.g. using an MCC code), or a specific product (or service) at any merchant. The categories for the incentive can be determined from the specific patterns where a transaction was found to be likely. In one embodiment, incentives can also be determined based on inventory levels, which also can be predicted from patterns of affinity groups. In another embodiment, the incentive is valid only during the predicted time window.

In various embodiments, the incentive can also be based on how likely a transaction is, whether patterns from other consumers are used, and how closely the keys for the pattern match the keys for the transaction being encouraged. For example, knowing the likelihood can influence how much of a discount to be sent in a coupon. If a consumer is only medium likely to make the transaction during a time window then more incentive can be required relative to if the consumer is highly likely. In one implementation, relative values of likelihood between different transaction patterns can be determined by normalizing across all transactions, or across certain patterns.

In one embodiment, the payment processing network 26 may have relationship deals with specific companies, advertisers, or manufacturers for sending incentives. The payment processing network 26 may then retrieve an incentive from an incentive system 27 that is coupled with or part of the payment processing network 26. The incentive system 27 may be a simple repository of incentives or information on specific incentives. In one embodiment, the payment processing network 26 can identify specific properties of a incentive (e.g. merchant, merchant type, product, . . . ) and then query the incentive system 27 for an incentive. The incentive system 27 may be tasked with keeping an up to date listing of incentives that may be used. The incentive system 27 may also retrieve incentives from servers associated with particular merchants, manufactures, advertisers, or other companies.

In some embodiments, the incentive can be for a different product than what has previously been purchased. In one embodiment, a pattern may be observed for transactions at a specific merchant, but the transactions do not always or generally include a certain product at the merchant. An incentive for that product could be sent at a time corresponding to the next transaction. For example, a consumer can be encouraged to buy a new product (e.g. music) from a coffee shop, when the consumer is next predicted to visit the coffee shop to buy coffee. An incentive could also be sent for a store near the coffee shop.

In other embodiments, an incentive can be used for the same product to reward loyalty (e.g. so the consumer continues coming back at the predicted time). In various embodiments, an incentive can be for reduced price, layaway offer, offer of financing, and warranty. The type of incentive can also be determined based on when the incentive is sent, which can be correlated to the time window. For example, a layaway plan might be provided if the time window is near the holidays.

In step 360, an incentive for the transaction is sent to the consumer such that the consumer receives the incentive at a time correlated with the predicted time window. For example, the incentive can be sent just before the time window or at the beginning of the time window. The exact amount of lead time may depend on the length (duration) of the time window and when the prediction is made. For example, if the time window is very short and/or the time window starts soon after the prediction calculation is performed, then the incentive can be sent just before the time window. Such a scenario can be typical when the prediction calculation is performed in response to receiving an initial transaction that is typically followed soon after by the final transaction of a correlated pair. In another example, the incentive could be sent to the consumer during the time window, which may be done in instances when the time window is long. In yet another embodiment, the incentive can be sent at a predetermined time (e.g. 10 minutes, 1 hour, one day, or one week) before the start of the time window.

The incentive may be transmitted in any number of suitable ways. In one embodiment, an electronic message may be sent to the consumer or a device (e.g. a phone or computer) associated with the consumer. Examples of electronic messages include a message sent to a consumer's phone (e.g., SMS or MMS by including a coupon code) and an e-mail, which can have a code and may be printed. In another embodiment, the incentive is a physical object that is delivered by mail or other delivery service. Thus, an object (such as an envelope, package, or mailer of just the incentive itself) including the incentive may be sent to a physical address (e.g. home or business) associated with the consumer. In one embodiment, the incentive is sent to a particular address (physical or electronic); and if a transaction using the incentive occurs for a consumer associated with that address (e.g. product is order from or shipped to that address), then the use of the incentive can be used to authenticate the consumer.

IV. Analysis of a Pattern

If a pattern of when transactions occur is known, then the pattern can be used to determine what times to send an incentive and what type of incentive to send. For example, if a pattern (e.g. a pattern of transactions associated with specific keys) for one or more previous months is known, embodiments can use this pattern to determine a pattern for a future month (e.g. for same month next year or for a next month). Incentives can then be sent encourage existing patterns to continue or create new ones based on a likelihood for other similar consumers (e.g. an affinity group). The patterns can be analyzed in numerous ways, and FIG. 4 describes some embodiments.

Figure 4:
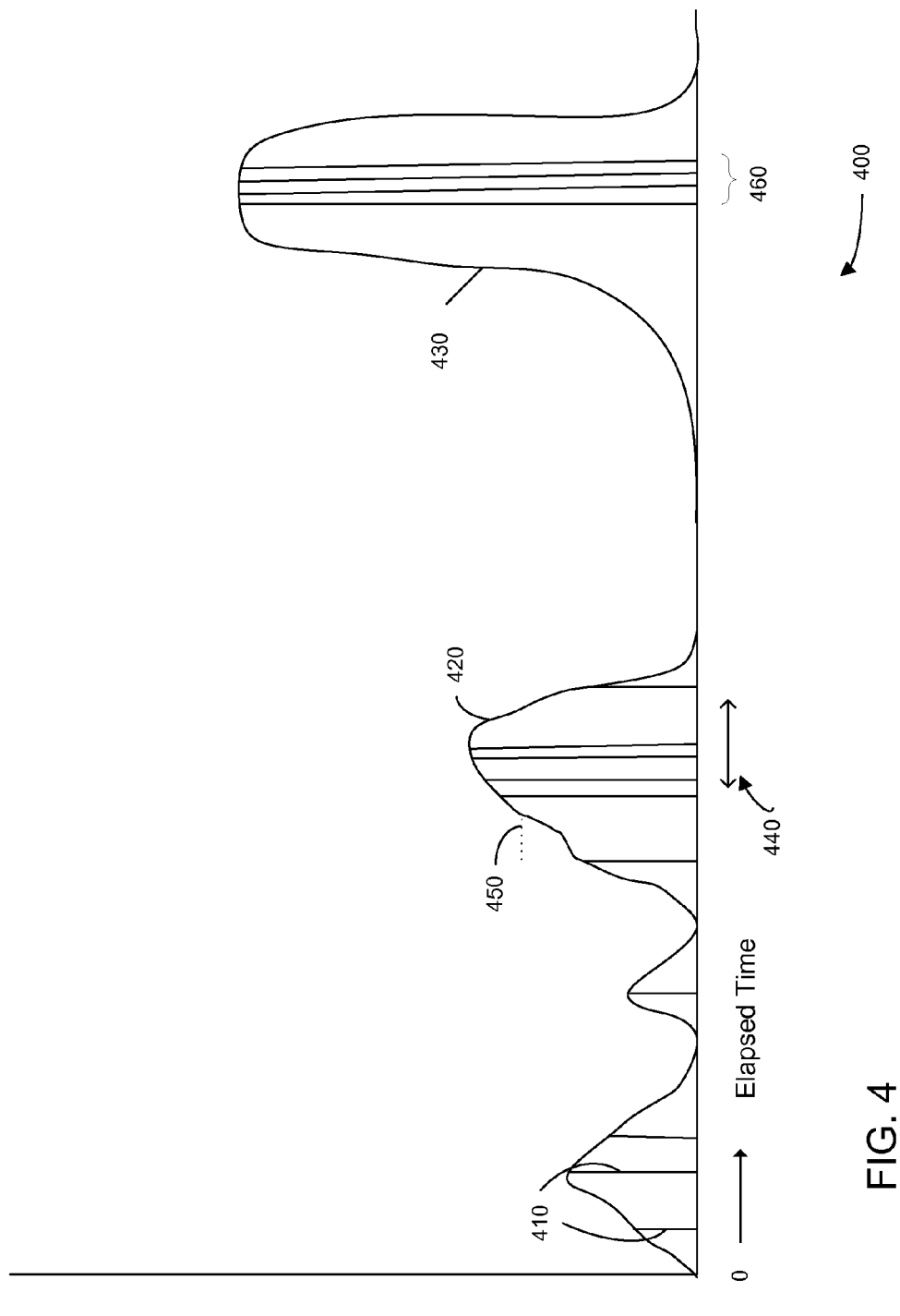
FIG. 4 is a plot of a number of transactions at certain elapsed times between a final transaction (with key KF) and an initial event (with key KI) of a correlated key pair according to embodiments of the present invention.

FIG. 4 is a plot 400 of a number of transactions at certain elapsed times between a final transaction (with key KF) and an initial event (with key KI) of a correlated key pair according to embodiments. Plot 400 can be considered as a histogram. The X axis is elapsed time between a final transaction and a correlated initial event. Any unit of time may be employed, such as minutes, hours, days, weeks, and even years. The Y axis is proportional to a number of transactions. Each bar 410 corresponds to the number of transactions at an elapsed time. Each bar 410 can increase over time as new transactions are received, where a new transaction would have an elapsed time relative to a correlated initial event. Note that more than one transaction-event pair can have the same elapsed time.

In one embodiment, the X axis can have discrete times. For example, only transactions for each day may be tracked. Thus, if the initial event was the start of a month, then the number of discrete time periods would have a maximum of 31 days. In such an embodiment, elapsed time values within a certain range can all contribute to a same parameter, and bars 410 may be considered as counters. For example, if the discrete times were by day, any two transactions that have an elapsed time of 12 days since a correlated KI event would both cause the same counter to be increased. In one embodiment, these counters are the time information that is stored as mentioned above. In some implementations, the time ranges do not all have the same length. For example, the time ranges closer to zero can have a smaller length (e.g. just a few minutes) than the time ranges further from zero (e.g. days or months).

A pattern 420 can be discerned from the elapsed times. As shown, pattern 420 has a higher value at elapsed times where more transactions have occurred. In one embodiment, pattern 420 could simply be the counters themselves. However, in cases where the time intervals are not discrete or have a small range, bars 410 might have zero or low value at times that happen to lie between many transactions. In these cases, certain embodiments can account for transactions at a specific time as well as transactions at times that are close. For example, as shown, a function representing pattern 420 begins curving up and plateaus near the cluster 460 of transactions to form a peak 430. In one embodiment, each time point of the function can have a value of a moving average of the number of transaction within a time period before and after (or just one or the other) the time point. In other embodiments, function can be determined from interpolation or other fitting method (e.g., a fit to periodic functions) performed on the counters.

Indicia of the pattern 420, e.g., the function values, can be analyzed to determine when a transaction is likely. In one implementation, peaks of the pattern 420 are identified as corresponding to times when a transaction is likely, and a time window is determined from indicia of the peaks. In one embodiment, a width of the function at specific values or times may then be used as the time window. For example, a time window (e.g. a two day or 1.5 day period) of when transactions often occur may be determined (e.g. as may be done in 340).

The time window may be determined in any number of ways and potentially with varied criteria. In one embodiment, a full width at half maximum may be used, such as the width of peak 430. In another embodiment, the window (e.g., 440) above a threshold value 450 is used, or just part of this window, e.g., starting at the time where pattern 420 is above the threshold and ending at the top (or other part) of peak 430. In yet another embodiment, the time window may have a predetermined width centered or otherwise placed (e.g. starting or ending) around a maximum or other value above a threshold.

In embodiments using a threshold, the value of the pattern function may be required to be above the threshold value before a transaction is considered likely enough to occur to send an incentive to a consumer. As mentioned above, multiple threshold levels can be used, with the various levels potentially being used to determine when, how, and what incentives to use. The use of thresholds encompass using the exact likelihood values, which can be equivalent to using many threshold levels. The modeling function mentioned above may be used to perform any of these determinations.

In one embodiment, a threshold determination could be whether a counter has a high enough value (absolute or relative to one or more other counter). In another embodiment, a threshold level can be relative (e.g. normalized) compared to a total number of transactions. A normalization or determination of a threshold can be performed by adjusting the level depending on the low values of likelihood of a pattern, e.g., a peak to trough height could be used. In one aspect, the troughs may be offset to zero.

Storing time information that includes a number of transaction at certain elapsed times, one can not only handle paths (such as initial key to final key), but one can also easily identify multiple patterns. Each peak can correspond to a different pattern. For example, each peak can correspond to a different frequency of occurrence for a transaction associated with the final key relative to an event (e.g. a transaction) associated with the initial key. In one embodiment, the time information for the elapsed times can be stored by storing a time of when both events occur. In another embodiment, time information can store the elapsed time as one value. In yet another embodiment, the time of one event might implicitly include the time of the initial event (e.g. when the first event is beginning of a month or other fixed time period).

From FIG. 4, one can identify one predominant pattern (peak 430) with a long wavelength (short frequency), which does not occur very often, and three minor peaks with higher frequencies. However, the determination of a pattern might still take significant computational effort if the pattern can have any functional form.

V. Use of Periodic Functions and Counters

Some embodiments use certain functional forms to help identify different patterns. As mentioned above, periodic functions can be used, e.g., $e^{iwt}$, where w is a frequency of the pattern. For example, each bar (counter) 410 of FIG. 4 can correspond to a different frequency. The total probability V of a K2 transaction occurring at a time t after a K1 transaction can be considered as proportional to $$\sum_W C_w e^{iwt},$$

where $C_w$ corresponds to the counter value at the frequency w and w runs over all of the frequencies. $C_w$ can be considered a coefficient of the periodic function $e^{iwt}$ at a particular frequency. Thus, conceptually, a probability can be calculated directly from the above formula.

In one embodiment, the frequencies are pre-selected thereby allowing an efficient determination of the patterns. Further, the frequencies can be identified only by the associated wavelength, or wavelength range. Note that in certain embodiments, the use of $e^{iwt}$ is simply a tool and the actual value of the function is not determined.

Figure 5A:
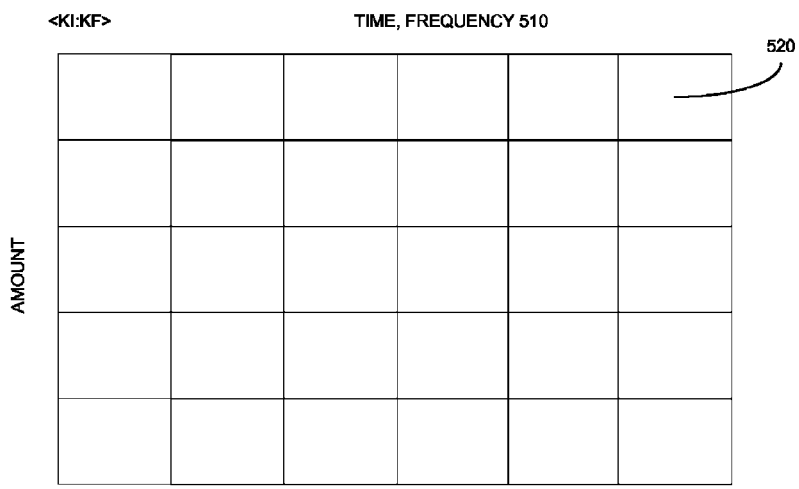
FIG. 5A shows a table for use in determining a periodic probability function that approximates a pattern of transactions according to an embodiment of the present invention.

FIG. 5A shows a table 500 that stores time information for a key pair <KI:KF> according to embodiments of the present invention. The table 500 stores information for elapsed times between transactions associated with the particular key pair. Table 500 can also store amount information for the transactions. Table 500 can be viewed as a tabular form of plot 400 along with all the possible variations for different embodiments described for plot 400.

In one embodiment, each column 510 corresponds to a different time range. The time range may correspond to ranges mentioned above with reference to FIG. 4. As shown table 500 has 6 time ranges, but any number of time ranges may be used. The time ranges can be considered to correspond to different functions that approximate the transaction patterns of a consumer or other entity. For example, each time range can correspond to or be considered a different frequency w for $e^{iwt}$.

In some embodiments, table 500 only has one row. In other embodiments, the rows of table 500 correspond to different dollar amounts (or dollar amount ranges). Thus, each time range may have subgroups for set ranges of amounts (e.g. dollar amounts). The organization is similar to a matrix, where a row or a column can be viewed as a group or subgroup. Although five amount ranges are shown, table 500 can have any number of dollar amounts. In some embodiments, there is only one row. i.e. when dollar amounts are not differentiated. Note that the convention of row and column is used for ease of illustration, but either time or amount could be used for either row or column (each an example of an axis). Also, the data for a table can be stored in any manner, e.g. as a single array or a two-dimensional array.

The values for the matrix elements 520 correspond to a number of KF transactions that have elapsed times relative to a KI event (e.g. a transaction) that fall within the time range of a particular column 510. In one embodiment, each newly received K2 transaction can cause a box (element) 520 of the table (matrix) 500 to be increased. The value of the matrix element (an example of a likelihood value) can be incremented by one for each transaction, or another integer or non-integer value. The value can also be a complex number, as described below. In another embodiment, a table can be required to have a certain total of all values, average of the values, minimum value in any matrix element, or other measure of the values in the table. Such a requirement can ensure that enough data has been received to provide an accurate pattern.

The values of the matrix elements can be used to determine the pattern for the key pair <KI:KF>, e.g. as part of step 330 of method 300. For example, matrix elements with high values relative to the other matrix elements can indicate a pattern of transactions in the corresponding time range, which can correspond to a particular frequency w. In another embodiment, one could view each matrix element in isolation to determine whether a transaction is likely. For example, if a matrix element exceeds a threshold value, it may be determined that a transaction is likely to occur in that time range. The threshold can be determined in various ways, for example, as a function of a sum of all of the matrix elements, or equivalently can be fixed with the matrix elements being normalized before a comparison to a threshold. Thus, step 330 can be accomplished easier based on how the time information is stored.

As mentioned above, the time ranges can all be of the same length (e.g. 24 hours) or be of varying lengths. In one embodiment, the first column is of very short time length, the second column is of longer time length, and so on. In this manner, more detail is obtained for short wavelengths while still allowing data to be stored for long wavelengths without exhausting storage capacity. In another embodiment, dollar amount ranges are progressively structured in a similar manner as the time ranges can be. In one implementation, the dollar amount range can be used to track the likelihood of transactions having certain dollar amounts.

Figure 5B:
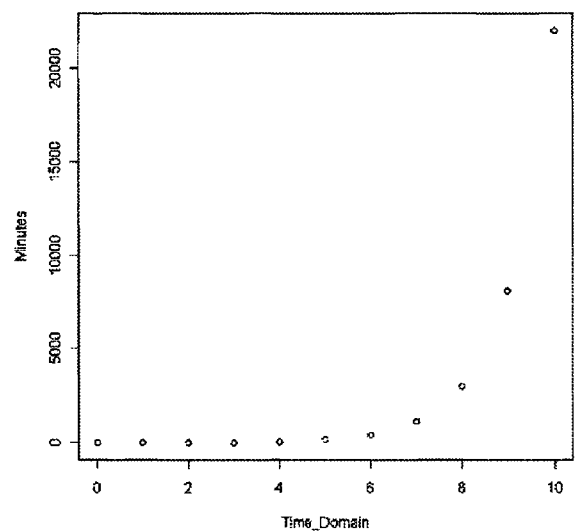
FIG. 5B shows a plot for use in determining a number of columns (buckets) of time or frequency to separate the previous transactions according to an embodiment of the present invention.

FIG. 5B shows a plot 510 for use in determining the time ranges for table 500 according to an embodiment of the present invention. The X axis corresponds to the column numbers. The Y axis corresponds to the time of a particular column in minutes. For example, the first column includes times between the first data point at time domain zero and the data point at time domain 1. Due to the large scale of the Y axis, the second data point appears to be at zero, but is simply quite small relative to the maximum value.

The wavelength $\lambda$ of a pattern corresponds to the time range of a column. For embodiments, using time relative to another transaction, then the $\lambda$ is the time between transactions. In one embodiment, 16 time domains (ranges) are selected as follows: $\lambda_0$ is under 1 minute, $\lambda_1$ is between 1 minute and 2.7 minutes, $\lambda_2$ is between 2.7 minutes and 7.4 minutes, $\lambda_3$ is between 7.4 minutes and 20 minutes, and $\lambda_{15}$ is over 1.2 million minutes.

The amount values can also be used to determine patterns for transactions of certain dollar amounts. If the amount is not of concern, then the values in a column can be summed to get a total value for a certain time range. The amounts can also be incorporated into the mathematical concept introduced above. For example, in mathematical notation, a value function can be defined as $$V = \sum_W C_w A e^{iwt},$$

where A is an amount of a transaction.

When a transaction is received, the amount and corresponding elapsed time for a particular key pair can be used to determine a corresponding matrix element for the key pair table. The values in the matrix elements can be normalized across one table and across multiple tables. For example, a value can be divided by a sum for all the values of a particular key pair table. Also, a sum can be calculated for all values across multiple tables, and the values for each table divided by this sum. As part of a normalization, the value for a matrix element may be decreased when some of the data used to determine the value becomes too old. For example, for a time range that includes short time intervals, counts from transactions that have occurred more than a year ago may be dropped as being out of data since short timeframe patterns can change quickly.

In various embodiments, tables for different key pairs can have different time ranges and/or amount ranges. If such differences do occur, the differences can be accounted when a summing operation is performed. In one embodiment, the values in the matrix elements can be smoothed to account for values in nearby matrix elements, e.g., in a similar fashion as pattern 420.

In another embodiment, tables for different consumers can be compared to determine affinity groups. For example, tables with matching or similar key pairs can be subtracted (lower value more similarity) or multiplied (higher value more similarity). The closer the tables are, the more similarity (e.g. as a percentage) the consumers are, where non-matching tables can be used for normalization. In one example, one set of tables can correspond to the affinity group, and the calculation can be used to determine whether a person is within the affinity group.

In other embodiments, specific amount ranges or time ranges can be suppressed. For example, if only certain types of patterns (e.g. only certain frequencies) are desired to be analyzed, then one can suppress the data for the other frequencies. In one embodiment, the suppression is performed with a mask matrix that has zeros in frequency columns and/or amount rows to be suppressed. Thus, one can just multiply the matrices to obtain the desired data. The amount ranges can be similarly suppressed. When suppressing certain frequencies, these mask matrices can act similarly to a high pass, low pass, or notch filters. For example, if one wanted a coupon to be good only for 7 days, and it takes 1 day to create the coupon, the desired time window is any time range that includes those 6 days. Accordingly, the time information for transactions outside the time window can be suppressed as not being of interest.

Regarding the creation and updating of such tables, after an event (e.g. a consumer transaction) is received, embodiments can determine which tracked key pairs have finals keys that match with the keys resulting from the transaction. As a transaction can be associated with many keys and key pairs, a transaction may cause many tables to have a matrix element updated. For example, the transaction may cause different tables for a specific consumer to be updated. The updates could be for one table for all transactions by that consumer (an example of a general table), and more specific tables for particular zip codes, merchants, and other key elements. The transaction can also cause updates of tables for the particular merchant where the transaction occurred.

As there are different tables that can be updated, each with a different initial key, the time range (and thus the matrix element) that is updated may be different for each table. For example, when elapsed time is used, the last transaction for each table may be at a different elapsed time since the different initial transactions. The transaction amount would typically be the same, thus the exact row for the matrix element to be increased can be the same, as long as the tables have the same amount ranges. But the column (i.e. time) could be different for each table.

Regarding which time column to update, there can also be more than one column updated for a particular table. For example, a K2 transaction may have different time patterns relative to K1 transactions (i.e., <K1:K2> pair). Accordingly, when a K2 transaction is received, elapsed times from the last two, three, or more K1 transactions could be used to update the table.

In a similar manner, one key pair table could be <*:K2>, which includes correlations from a plurality of initial keys to the K2 key in the same table. Effectively, this table could equal the sum of all tables where K2 is the final key for a particular consumer or other entity. However, if the individual key pairs are not significant enough, the <*:K2> table may be the only table that is tracked. Tables of the type <K1:*> could also be tracked.

VI. Using Tables to Determine Time Window

To predict a likelihood of a future event (e.g. a transaction), some embodiments can obtain the relevant key pair tables for the entity (e.g. a consumer) and then analyze these tables. Which tables are obtained and how they are analyzed depends on exactly what events are trying to be predicted, i.e. the question being answered.

Figure 6:
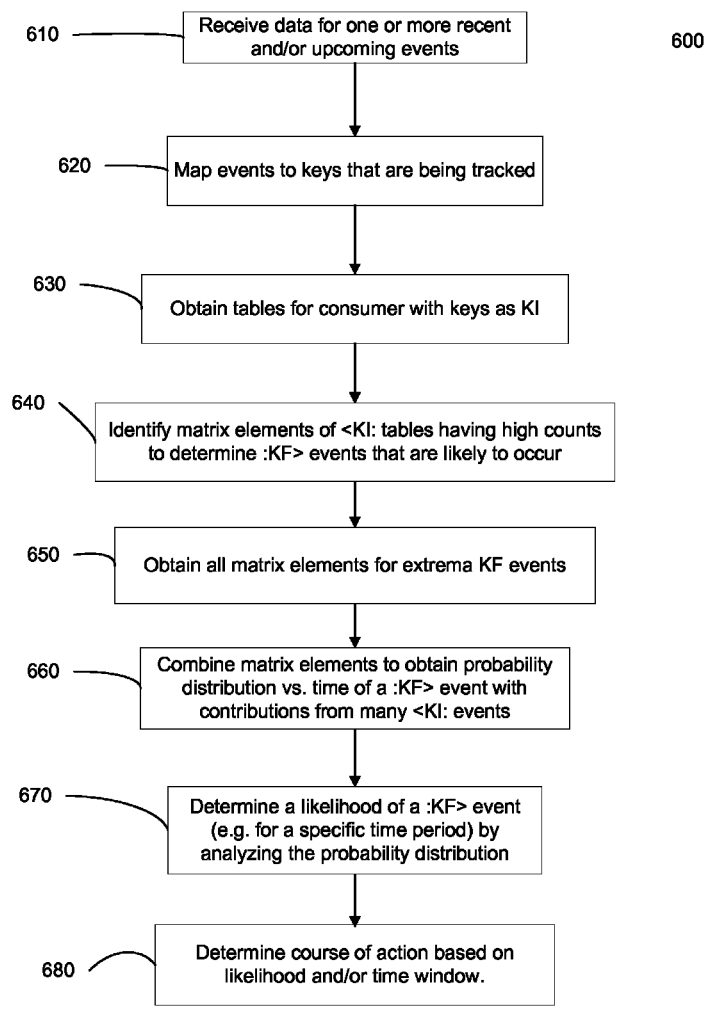
FIG. 6 a flowchart of a method for determining a likelihood of a transaction and a time window of its occurrence according to embodiments of the present invention.

FIG. 6 is a flowchart of a method 600 for determining a likelihood of a transaction and a time window of a likely occurrence according to embodiments. Method 600 can be performed by any one, plurality, or combination of computer apparatus described herein, and components thereof.

In step 610, data for one or more recent and/or upcoming events is received. In one embodiment, the event data (e.g. transaction data) is associated with one entity, e.g., a particular consumer or affinity group. For recent events, whether an event is "recent" can be relative to other events. For example, if an event does not occur often, a recent event (e.g. a last event of that type) can still occur a long time ago in absolute terms. For an upcoming event, the event has not occurred yet, but can be known to occur. For example, the start of a month (or other time period) has a known time of occurrence. As another example, a scheduled event (such as a sporting event or concert) can be used. Data for these scheduled events can be obtained before they occur due to the nature of these events.

In step 620, the event data is used to map each event to one or more keys KI. In some embodiments, the mapped keys KI are specifically keys that are being tracked for an entity. In step 630, tables of patterns that have an initial key of KI are obtained, thereby providing <KI: tables relevant to the received event data. In one embodiment, a matching and retrieval function identifies the relevant tables using methods described herein. The matching and retrieval function can also match tables that do not have the exact same key, but similar keys. A similar key can be a broader version (e.g. first 3 digits of a zip code) of a more specific key (e.g. 5 digit zip code). Examples of when such alignment would be performed include: when a specific key for a current transaction is received, but only a broader version of that key is being tracked; and when two entities are being compared and different key pairs are tracked. In embodiments where an event is an upcoming event, the upcoming event can be a final event (or effectively the time ranges can be negative with the upcoming event being an initial event), where transactions before the ending event are analyzed.

In step 640, the <KI: tables having matrix elements with sufficiently high counts are identified to determine KF events that are likely to occur. In one embodiment, to determine whether a matrix element has a sufficiently high count, one or more absolute or relative threshold numbers can be used. A relative threshold (e.g. a percentage) could be determined using a total number of counts for a table or group of tables. In another embodiment, all tables (i.e. not just ones with a matching KI for initial key) could be analyzed to find matrix elements with high counts, thereby eliminating steps 610 to 630. However, using recent or upcoming events can provide greater timeliness for any result, or action to be performed based on a result. The identified KF events along with the specific time ranges for the matrix elements with the high counts can then be analyzed.

In step 650, other matrix elements not previously identified are obtained for each likely KF event. For example, a KF event can be correlated to more initial keys than just the ones identified in step 620. These previously unanalyzed tables can also have high counts for certain matrix elements involving a KF event. The KF event can be used as a filter to identify unanalyzed tables, from which other high-count matrix elements can be obtained. Thus, this step can be used to obtain a more accurate likelihood for a specific KF event. Obtaining these other high-count matrix elements may not be needed, e.g., if KI is starting event, such as a beginning of a week, month, etc. In this case, since other tables might include the same data points, these other tables could just include redundant information.

Also, low count matrix elements for KF events already determined to be likely can be important if high accuracy is desired. For example, as the timeframes of the different :KF> tables can be different (due to different KI events), matrix elements having relatively low counts can correspond to the same timeframe as a high-count matrix element. Thus, the number of counts for a likely time range can be revised.

In this manner, high probability KF events can be determined based on a few recent or upcoming KI events, and then a full analysis of :KF> tables can be performed, as opposed to randomly selecting KF events to determine when they might be likely to occur. A KF event could be chosen for analysis, but a selected KF event might not be highly likely. However, if one were interested in a specific KF event, then it may be desirable to start method 600 at step 650.

In step 660, the matrix elements (e.g., just from step 640 or also from step 650) are combined to obtain a probability distribution vs. time for a :KF> event, which is correlated to many <KI: events. In one embodiment, each of the matrix elements for the KF event are combined from a portion or all of the <KI:KF> tables, where KI runs over the initial events that are correlated to the KF event. This combination can account for the fact that the different KI events occur at different times, and thus the time ranges for each table can be different (e.g. offset).

In one implementation, the earliest or latest KI event can be identified, and offsets for the time ranges of the other tables can be determined. The corresponding matrix elements can then be added using the offsets. If a time range of a matrix element of one table only partially overlaps an offset time range of another table, then the combination can be broken up into more time ranges with proportional contributions from each previous rime range. For example, if two time ranges overlap, then three time sections can result. The overlap section can receive contributions (i.e. a percentage of the counts) from the two matrix elements, with the amount of contribution proportional to the amount of overlap in time for the respective time ranges.

To determine a time range of high likelihood, a probability distribution can be created from the resulting time ranges X after the combination and the counts Y for each time range. The resulting time ranges X with the respective counts Y can be analyzed as a function Y=F(X), which can correspond to pattern 420 of FIG. 4. The Y values can be normalized so that the counts for time ranges of different lengths are accounted. The Y values can also be normalized based on the dollar amount of a transaction.

In step 670, a total likelihood for a KF event (e.g. across multiple initial events) is calculated. In one embodiment, the likelihood can be for a specific time window or for the KF event occurring at any future time. A specific time window may correspond to a predetermined time range of a matrix element, or be another time range that results from an overlap of multiple time ranges. For example, if two matrix elements overlap in time (e.g. because the KI events occur at different times), then the time window may have the range of the overlap time. In another embodiment, the likelihood for a KF transaction can also be for one or more specific amounts of the transaction, which can be selected by multiplying with a mask matrix.

To determine a time range of high likelihood, the probability function F can be analyzed. For example, the function F can be analyzed with a numerical routine to identify a maximum or regions having values above a threshold (or potentially within a range, e.g., using multiple thresholds). To identify maximum regions, techniques such as finite difference, interpolation, finite element, or other suitable methods, can be used to obtain first and second derivatives of F. These derivates can then be used in an optimization algorithm for finding a maximum. Global optimization methods can also be used, such as simulated annealing.

In addition to finding a time window when an event is likely, a total probability over a specific time period can be obtained. In one embodiment, the function F can be integrated (e.g. sum counters for time ranges) over the desired time range. In effect, to obtain a probability that an event will occur within a prescribed time period, one can integrate contributions over all of the relevant key pairs during the time period. As an example with one key pair, a probability that someone will perform a certain event (e.g. a transaction) once they are visiting San Francisco can be obtained by integrating the key pair <SF:KF> over all of the desired time periods. In one aspect, time periods of greater than one month may not be relevant if a person never stays in San Francisco for that long (which could be identified from a location of a person's phone or by locations of transactions). One could also determine a probability for a transaction to occur in November in a similar way.

As an alternative to all of the above steps, one can select a particular event and a particular time, which can be used to select the relevant patterns from which the corresponding matrix element can be analyzed. If the tables indicate a desirable likelihood (e.g. relative to threshold values), then an incentive can be sent for that consumer. Multiple consumers can be analyzed in this process. In this manner, a seller can determine an incentive to send for a particular transaction and then simply find the consumers that would more likely respond.

In one embodiment, the relevant patterns from which the corresponding matrix element are selected by creating a set of key pair tables with 1 or other non-zero values in the appropriate matrix elements. These tables are then multiplied by the saved tables (i.e. known patterns) to obtain the likelihood, effectively filtering out the desired values. Besides a particular time, a time window can also be specified, which may cause more than one matrix element in a table to have a non-zero value. In this case, the non-zero values can be based on a level of overlap of the time window with the corresponding time ranges of the matrix elements.

Referring back to method 600, in step 680, a course of action can be determined based on likelihood and/or time window. Various example actions and determinations are now described. If a likelihood is low, then no action can be taken. If a likelihood is high, then a time window for that high likelihood can be determined. If the time window starts soon, an action that can be performed soon (e.g. sending a coupon via e-mail or text message) can be initiated. Whereas if the time window does not start for an extended period of time, an action that takes longer (e.g. creating a mailer) can be performed.

Also, once an event is found to be likely, further analysis can be performed regarding an incentive. For example, a cost of an action, such as the cost of sending an incentive, can be determined as part of a cost-benefit analysis. For example, the cost of a paper brochure, internet ad, or text message may impact if an incentive is sent, which type of incentive is sent, and how an incentive is sent. In one embodiment, the cost of an action can include a possible loss due to fraud, which can be calculated by comparing a recent transaction pattern of a consumer to patterns known to be fraudulent (e.g. by multiplying tables of a consumer against tables of a fraud entity). In another embodiment, a profit of an event can be determined, e.g., the profit from a transaction resulting from an incentive. If the profit is high, then a higher cost and lower likelihood can be tolerated. A profit can also include situations where inventory levels are high, and thus the product needs to be sold quickly.

In one embodiment, calculations for the prediction of an event can be run in real time (e.g. within several hours after an event or series of events occur). In another embodiment, the calculations can be run as batch jobs that are run periodically, e.g., daily, weekly or monthly. For example, a calculation can run monthly to determine who is likely to buy a house, and then a coupon for art, furniture, etc. can be sent to that person. In various embodiments, prediction of major purchases can generally be run in larger batches, whereas prediction of small purchases can be run in real-time (e.g., in reaction to a specific transaction).

In some embodiments, ending events also can be used similarly to predict what may happen before the event. Since the occurrence of an ending event can be known ahead of time (e.g. scheduled for a particular time), the correlated initial events can still be predicted. For example, consumer activity prior to a schedule sporting event can be determined, which may be done, e.g., using tables having negative time ranges with the ending event as an initial key or with positive time ranges with the ending event as a final key. An incentive can be sent for a transaction occurring before the sporting event (or other ending event), as described herein.

VII. Impedance (Likelihood of Another Transaction)

Besides being able to predict when a particular transaction will occur, embodiments can also predict if another transaction is going to occur after a current or a predicted transaction, which is referred to as impedance. In some embodiments, such information can be tracked by using complex numbers for the matrix elements of the final event, with the imaginary part corresponding to the impedance. In other embodiments, the impedance can be tracked simply using another number for a matrix element or using another table.

In such embodiments, the imaginary part of a matrix element can correspond to an impedance that measures how likely it is that another transaction will occur. The likelihood can specifically correspond to a future transaction being correlated to the current transaction having the time range and dollar amount of the matrix element. The real value of a matrix element can correspond to the probability that the KF event will occur, and the imaginary value can relate to the probability that another event will be correlated to the KF event. The imaginary part can be updated when another transaction is correlated to the KF event of the specific time and amount. In one embodiment, a table can have just one impedance value for the likelihood of any transaction occurring later. Thus, just one imaginary part could be stored for an entire table. In another embodiment, the imaginary parts could be different for each matrix element.

In an embodiment, a low impedance (e.g. a large negative imaginary part) for a matrix element means that there is a high probability that another transaction is going to occur, and a high impedance (e.g. high positive value) means that it is unlikely that another transaction is going to occur, with zero being indeterminate. The implication of negative and positive values can be swapped. In another embodiment, a high impedance is provided by a low number (negative or positive), with larger numbers providing low impedance, or vice versa. Certain future transactions can be ignored (e.g. not counted) in determining impedance, for example, if the dollar amount is too low.

Figure 7:
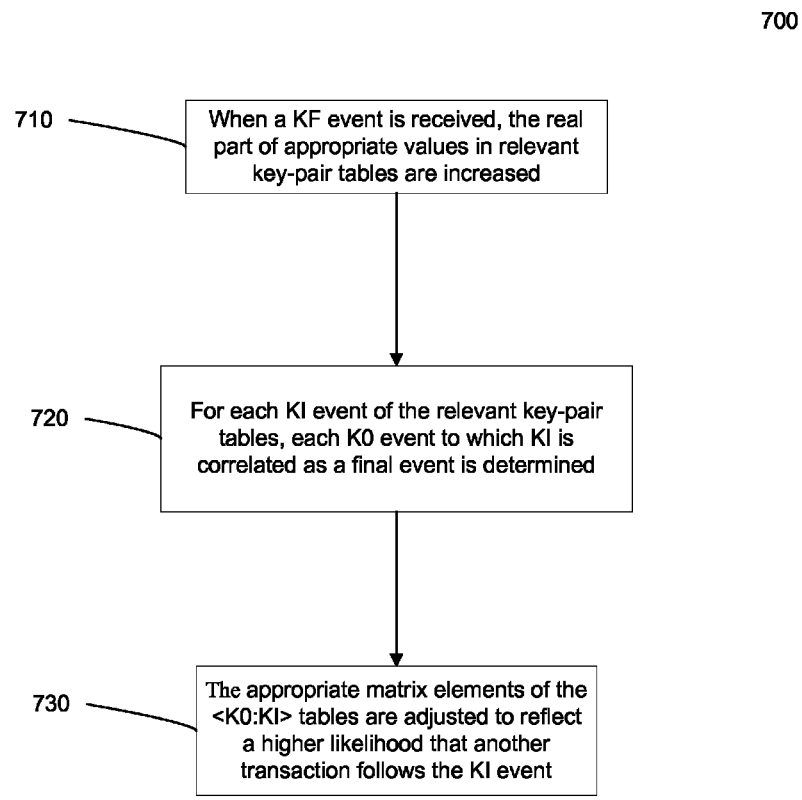
FIG. 7 is a flowchart of one method for tracking an impedance of a transaction to future transactions by updating values using a backward flow of events according to embodiments of the present invention.

FIG. 7 is a flowchart of one method 700 for tracking an impedance of a transaction to future transactions by updating values using a backward flow of events according to embodiments. In step 710, when a KF event is received, the real part of appropriate values in relevant key pair tables are increased. For example, each of the key pair tables that have the transaction as the ending event are increased in the appropriate matrix element, with an elapsed time measured from the respective starting event KI.

In step 720, for each KI event of the relevant key-pair tables, each K0 event to which KI is correlated as a final event is determined. For example, for each table in which KF is the final key, the specific KI event to which KF was correlated is identified. Then, for each identified KI event, each K0 event to which the KI is correlated as a final event is determined.

In step 730, the appropriate matrix elements of the <K0: KI> tables are adjusted. The appropriate matrix elements of specific tables can be determined using an elapsed time between the specific KI and K0 events. The individual matrix elements can be adjusted (e.g. decreased to obtain a reduced impedance) to reflect a higher likelihood that another transaction follows the KI event, since the KF event did indeed follow. If all of the matrix elements for a table have the same imaginary part, then the specific KI event does not need to be known, just the tables that have the key for an ending KI need to be known, which can be determined with filters operating on the final keys.

Figure 8:
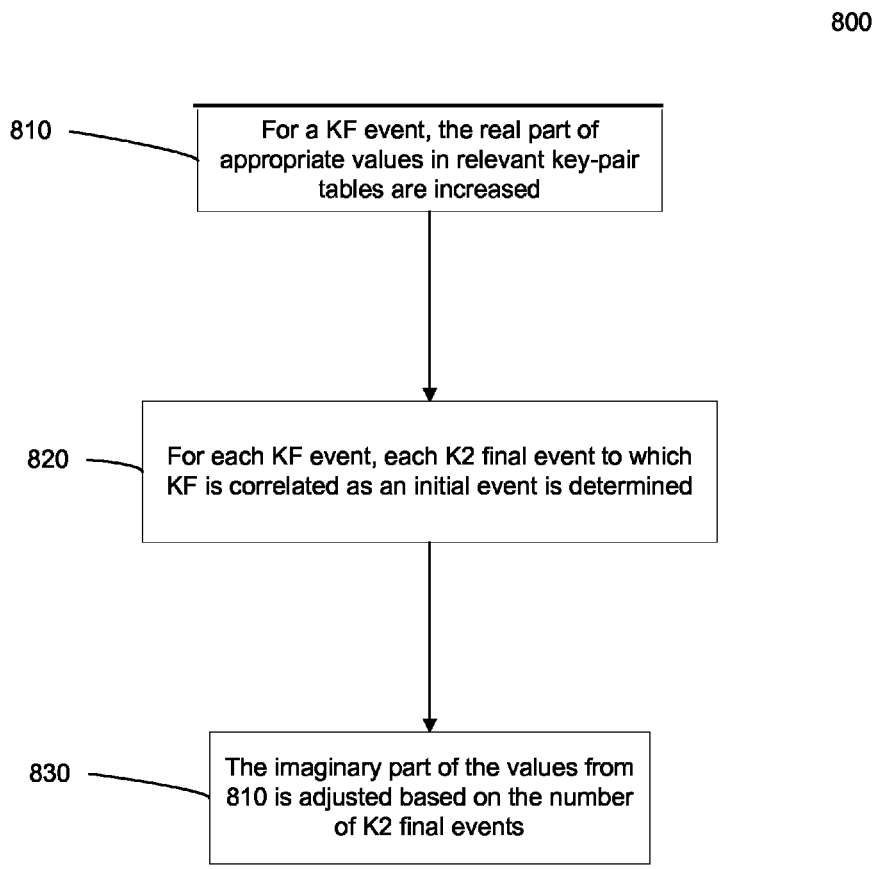
FIG. 8 is a flowchart of a second method for tracking an impedance of a transaction to future transactions by updating values using a forward flow of events according to embodiments of the present invention.

FIG. 8 is a flowchart of a second method 800 for tracking an impedance of a transaction to future transactions by updating values using a forward flow of events according to embodiments. In step 810, a KF event is identified, and each of the key pair tables that have KF as the ending event are increased for the real part in the appropriate matrix element, with a KI event being the starting event. In one aspect, KF might not have just come in, but could be part of a whole collection of events being processed.

In step 820, for each KF event, each K2 final event to which KF is correlated as an initial event is determined. In step 830, the imaginary part of the values from 810 is adjusted based on the number of K2 final events. Depending on the number of K2 transactions, the imaginary part of the appropriate matrix element can then be adjusted (e.g. increased, decreased, set, or reset). At this point, the imaginary part for just one matrix element (e.g. the matrix element from (a)) of tables for KF could be determined. Or, all of the other matrix elements of the tables could also be determined as well based on the value for the specific matrix elements just determined. For example, all of the other matrix elements of a table can be updated to reflect that the K2 transaction occurred. This can be done when all of the imaginary parts are the same, or if just one value is stored for an entire table.

In one embodiment, the default for the imaginary part can be set at zero or some average value for a likelihood that a transaction occurs. If after a certain amount of time, there are no transactions correlated to it, then the value might increase and continue to increase. Or the default could be set at a high impedance, and then lowered as more transactions occur. In another embodiment, if the future transaction is fraudulent, then the complex part can also be changed to reflect a higher impedance since a valid transaction does not occur. In another embodiment, if a decline occurs after a transaction then the impedance is increased (e.g. the imaginary part is decreased by one), if an acceptance occurs after a transaction then the impedance is decreased (e.g. the imaginary part is increased by one).

Instead of or in addition to the above use of imaginary values for impedance, greater impedance can also correspond to fraud. If a fraud transaction K2 is found to correlate to a transaction K1, then the <KI:K1> matrix elements (or just a specific element) can have the impedance increased. Thus, the impedance can reflect the profitability of the present transaction. For example, certain transactions happening right after buying a concert ticket can be associated with fraud, which is an example of where each matrix element may have its own complex part.

In some embodiments, both real and imaginary parts of a matrix element can contribute to an overall value, which provides whether the transaction is a good transaction with regards to likely occurring or being a transaction that leads to other transactions. Such transactions can be encouraged. In other embodiments, values for the real or the imaginary components can be analyzed separately. In one implementation, when complex numbers are used, multiplications are performed by multiplying the real parts by the real parts and imaginary parts by the imaginary parts (i.e. real*real and imaginary*imaginary).

A. Incentive to Encourage a Gateway Transaction

A transaction can be determined to be a gateway transaction that leads to many other transactions, e.g. when a transaction has a low impedance. A gateway transaction can then be encouraged with an incentive. For example, a merchant can send a incentive for a transaction knowing that the transaction is correlated to other later transactions with that merchant. As another example, an incentive can be sent for a transaction at a first merchant that is known to correlate to later transactions at a second merchant. The cost of the incentive could be shared between the two merchants. However, the specific later transaction need not be known.

Figure 9:
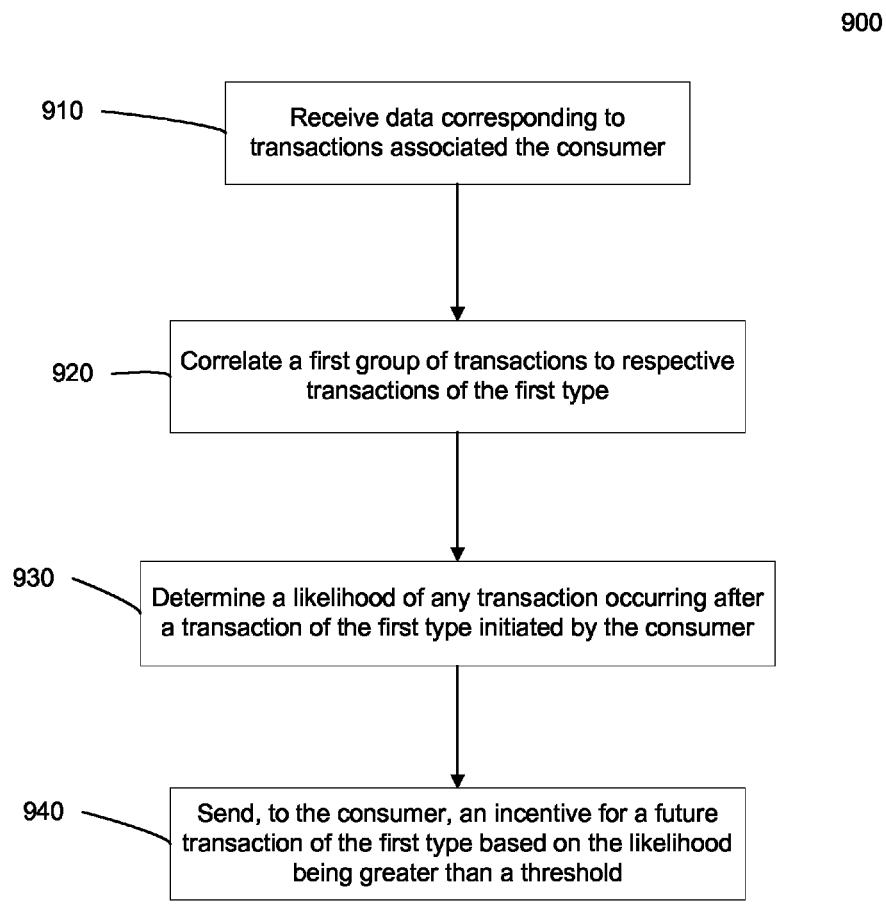
FIG. 9 is a flowchart of a method for providing an incentive to a consumer to encourage a gateway transaction according to embodiments of the present invention.

FIG. 9 is a flowchart of a method 900 for providing an incentive to a consumer to encourage a gateway transaction according to embodiments. In step 910, data corresponding to transactions associated with the consumer are received. In one embodiment, the transactions are ones previously performed by the consumer.

In step 920, a first group of transactions are correlated to respective transactions of a first type. In one embodiment, a transaction of a particular type corresponds to a specific key, as described above. For example, a transaction of the first type can be for a specific merchant, industry code, product code, etc. In one aspect, a correlated transaction of the first group occurs after a respective transaction of the first type.

In step 930, a computer system determines a likelihood of any transaction occurring after a transaction of the first type initiated by the consumer. The likelihood can be determined in various ways. In one embodiment, determining the likelihood uses the number of correlated transactions. For example, the more correlated transactions can mean that the likelihood of a future transaction is greater. In another example, the number can be used in variety of ways, e.g., to increase or decrease a value that is proportional to the number. Then the value can be used to determine the likelihood.

In some embodiments, a value (e.g. imaginary part of the matrix element) can be increased when a correlated transaction occurs after a transaction of the first type. The value stored can be associated with an identifier of the first type of transaction (e.g. KF). In one implementation, the value can be decreased when a decline of a correlated transaction occurs after a transaction of the first type. In another implementation, the value can be decreased when a correlated transaction does not occur after a transaction of the first type during each of one or more time periods.

In one embodiment, many values can be used, e.g., for different times for a <KI:KF> pair and for a different <KI:KF> pairs. In this manner, one can determine when is a best time to incentivize a transaction of the first type. In one aspect, just one imaginary part of a matrix element can be used. In another aspect, an average or sum of all of the imaginary parts of the matrix elements of a particular table can be used to determine whether any future transaction is likely. Also, the imaginary part can be aggregated over all KI correlated to a KF to determine a total likelihood that a KF will provide more transactions. In other embodiments, one can integrate over all key pair tables with KF as an initial key, as opposed to using a pre-computed imaginary part of a matrix element.

In step 940, an incentive for a future transaction of the first type is sent to the consumer based on the likelihood being greater than a threshold. In one embodiment, time intervals between the correlated transactions and the transactions of the first type are tracked, e.g., using the tables described above. In one implementation, one can determine a number of correlated transactions having time intervals within a specified range, and the incentive can be sent when the number is above a threshold. For example, when the number of transactions within the third, fourth, and fifth time ranges is above a threshold, the incentive can be sent. As an illustration, the third, fourth, and fifth time ranges can correspond to 30 minutes to four hours. In this manner, the payoff of the future transactions being soon can be a determining feature.

In another embodiment, each of the tables with KF as the final transaction can be used to determine exactly when to send an incentive for the KF transaction and what the incentive might be. For example, the value (e.g. measuring impedance) can be associated with a particular time of a transaction of the first type occurring, and the incentive is sent at a time correlated with the particular time. In yet another embodiment, the correlated transactions can be correlated specifically to a transaction of the first type occurring at the particular time. Thus, although a transaction of the first type might be more likely to occur at a certain time, a first-type transaction occurring at a different time might be more likely to lead to future transactions.

B. Incentive to Encourage Transactions after a Dead End

A transaction can also be determined to be a dead end that does not lead to many later transactions. A high impedance can convey that the transaction is a dead end as no further transactions occur very often. In such instances, it can be determined that incentives are needed to encourage other transactions (e.g. as they do not happen naturally). Thus, transactions can be sent after a dead end.

Figure 10:
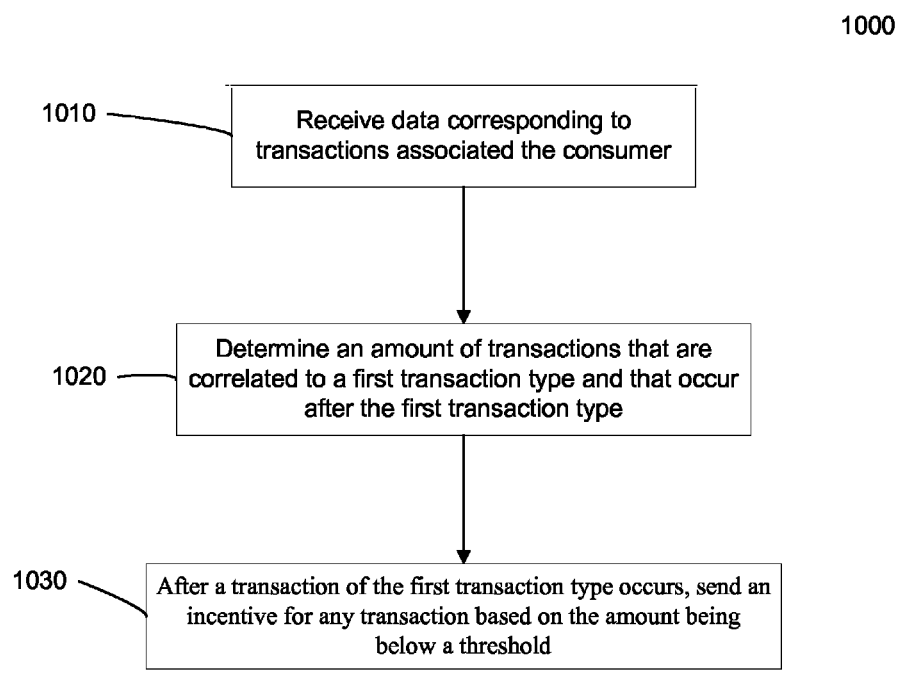
FIG. 10 is a flowchart of a method 900 for providing an incentive to a consumer to encourage transactions after a dead end according to embodiments of the present invention.

FIG. 10 is a flowchart of a method 900 for providing an incentive to a consumer to encourage transactions after a dead end according to embodiments. In step 1010, data corresponding to transactions associated with the consumer are received. In one embodiment, the transactions are ones previously performed by the consumer.

In step 1020, an amount of transactions that are correlated to a first transaction type and that occur after the first transaction type are determined. In various embodiments, the amount of transactions can be determined by methods described above. For example, the imaginary part of matrix element of key pair tables can be used to track the amount. In another embodiment, the key pair tables can be searched to identify the amount. The amount can be the number of correlated transactions or a value derived from the number.

In step 1030, an incentive for any transaction based on the amount being below a threshold is sent after a transaction of the first transaction type occurs. In one embodiment, the incentive can be sent when the amount is below the threshold and if certain other criteria are met. A criteria can be if an incentive (e.g. from incentive system 27) is for a transaction that the consumer is known to initiate or is likely to initiate, e.g., based on other transaction patterns. In one aspect, the incentive can be for a second merchant near the merchant for the transaction of the first type. In this manner, a consumer might be likely to use the incentive since the consumer is near or is often near the second merchant. The incentive can be sent as a message to a phone, which can have an advantage of reaching the consumer soon after the dead end transaction occurs and when the consumer's location can be easily known based on the location of the merchant.

In one embodiment, a criteria can be transaction patterns of other consumers (e.g. of affinity groups to which a consumer is similar), which can also be used to determine the incentive. For example, a dead end can be identified (e.g. by a computer system) for a consumer, and then identify a similar affinity group that does not show this dead end. An analysis can be made as to why the dead end exists, and actions taken to cause the dead end not to occur (e.g. sending a coupon, pre-authorization, or other incentive). For example, stores that the one affinity group does go to after the transaction can be identified, and coupons for that store can be sent to the consumer for that store. As another example, one can identify stores geographically near a merchant that is a dead end and send a coupon for a nearby store, even potentially for use within a short time period after a predicted visit to the dead end merchant. After seeing if a strategy works by sending coupons to a couple people in an affinity group, coupons can be sent to more people in the affinity group (possibly including people just partially in the affinity group).

In another embodiment, key pairs that should be correlated, but are not, can be used as a criteria of whether an incentive should be sent, and what the incentive should be. In one example, there may be equal transactions at a gas station and at a donut store, both in the same geographic location (e.g. same zip code). But, the transactions do not appear enough times to be correlated. The cause could be the consumer is using cash or another form of payment not being tracked. For instance, if only 10% at each are with the card, then only 1% might show correlation, which may not be enough to normally identify a correlation. After additional analysis, a possible correlation may be identified, and an incentive can be sent. In one aspect, the incentive can be used to test whether a correlation actually exists. Such a test can also be done when a consumer does not show a pattern exhibited in an affinity group to which the consumer belongs, or when two affinity groups have overlapping membership (but one does not show a pattern).

Any of the computer systems mentioned herein may utilize any suitable number of subsystems. Examples of such subsystems are shown in FIG. 11 in computer apparatus 1100. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 11 are interconnected via a system bus 1175. Additional subsystems such as a printer 1174, keyboard 1178, fixed disk 1179, monitor 1176, which is coupled to display adapter 1182, and others are shown. Peripherals and input/output (I/O) devices, which couple to I/O controller 1171, can be connected to the computer system by any number of means known in the art, such as serial port 1177. For example, serial port 1177 or external interface 1181 can be used to connect computer system 1100 to a wide area network such as the Internet, a mouse input device, or a scanner. The interconnection via system bus 1175 allows the central processor 1173 to communicate with each subsystem and to control the execution of instructions from system memory 1172 or the fixed disk 1179, as well as the exchange of information between subsystems. The system memory 1172 and/or the fixed disk 1179 may embody a computer readable medium.

A computer system can include a plurality of the same components or subsystems, e.g., connected together by external interface 1181. In some embodiments, computer systems, subsystem, or apparatuses can communicate over a network. In such instances, one computer can be considered a client and another computer a server. A client and a server can each include multiple systems, subsystems, or components, mentioned herein.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

It should be understood that the present invention as described above can be implemented in the form of control logic using hardware and/or using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices. Any of the values mentioned herein can be output from one component to another component and can be output to the user.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of providing an incentive to a consumer, the method comprising:
receiving data corresponding to previous transactions associated with the consumer, each of the previous transactions associated with one or more keys, and each of the one or more keys corresponding to a particular type of transaction;
storing, in a table corresponding to an initial key and a final key, counts of a plurality of elapsed times between previous transactions associated with the initial key and previous transactions associated with the final key, each elapsed time of the plurality of elapsed times corresponding to an elapsed time between one transaction associated with the initial key and one transaction associated with the final key;
determining, by a computer system, a likelihood for a future transaction at each future time of a plurality of future times, the future transaction being associated with the final key, the likelihood for the future transaction at each particular future time being determined based on a count of elapsed times in the table corresponding to the particular future time;
predicting, by the computer system, a time window when the consumer is likely to initiate the future transaction using the likelihoods at the plurality of future times; and
sending an incentive associated with the future transaction to the consumer such that the consumer receives the incentive at a time within the predicted time window.

2. The method of claim 1, wherein the determining of the likelihood for the future transaction at each particular future time is further based on one or more counts of elapsed times corresponding to the particular future time in one or more additional tables, each of the one or more additional tables corresponding to the final key and a different initial key.

3. The method of claim 1, wherein the predicting of the time window when the consumer is likely to initiate the future transaction is further based on a first threshold, wherein a duration of the time window is variable, a start of the time window based on a first likelihood at a first future time being above the first threshold and an end of the time window based on a second likelihood at a second future time being below the first threshold.

4. The method of claim 3, wherein a start of the time window is at a specified amount of time relative to the first future time when the likelihood is above the first threshold.

5. The method of claim 1, further comprising specifying specific values for categories associated with the future transaction, wherein the time window is when the consumer is likely to initiate the future transaction having the specified values, the categories including one or more of an account number, an amount of the transaction, a time and date, a type product or service, a merchant name or code, an industry code, a terminal field, and a geographic location.

6. The method of claim 1, further comprising determining that the consumer is within an affinity group including one or more other consumers, wherein the time window when the consumer is likely to initiate the future transaction is based on likelihoods of the one or more other consumers initiating the future transaction.

7. The method of claim 1, further comprising predicting a merchant at which the future transaction is to occur, wherein the incentive is for a first product that is available at the merchant, wherein the first product is a different product than a product predicted for the future transaction.

8. The method of claim 1, wherein the consumer receives the incentive during the time window.

9. The method of claim 1, wherein the incentive is sent at a predetermined time before the predicted time window.

10. The method of claim 1, wherein the incentive is valid only during the predicted time window.

11. The method of claim 1, further comprising:
determining a cost associated with the sending of the incentive; and
determining a benefit associated with the future transaction, wherein the sending of the incentive is based on the cost and the benefit.

12. The method of claim 1, wherein sending of the incentive includes sending an electronic message to the consumer, wherein the electronic message is selected from the group consisting of an SMS message, an MMS message, and an e-mail.

13. The method of claim 1, further comprising determining a peak time of the plurality of future times where a particular likelihood is a maximum, wherein the time window is correlated to the peak time.

14. A method of providing an incentive to a consumer, the method comprising:
receiving data corresponding to previous transactions associated with the consumer, each of the previous transactions being associated with one or more keys, and each of the one or more keys corresponding to a particular type of transaction;
storing, in a table corresponding to an initial key and a final key, counts of a plurality of elapsed times between previous transactions associated with the initial key and previous transactions associated with the final key, each elapsed time of the plurality of elapsed times corresponding to an elapsed time between one transaction associated with the initial key and one transaction associated with the final key;
determining, by a computer system, a likelihood of transactions associated with any key occurring within a time window after a first transaction associated with the initial key initiated by the consumer, the likelihood being determined based on a count of transactions associated with the table and having elapsed times corresponding to the time window; and
sending an incentive associated with a future transaction to the consumer based on the likelihood being greater than a threshold.

15. The method of claim 14, wherein the determining of the likelihood of transactions associated with any key occurring within the time window after the first transaction is further based one or more counts of transactions having elapsed times corresponding to the time window in one or more additional tables, each of the one or more additional tables corresponding to the initial key and a different final key.

16. The method of claim 14, wherein the first transaction is with a first merchant, wherein the incentive is for a second merchant, and wherein transactions at the first merchant correlate to later transactions at the second merchant.

17. A method of providing an incentive to a consumer, the method comprising:
receiving data corresponding to previous transactions associated with the consumer, each of the previous transactions being associated with one or more keys, and each of the one or more keys corresponding to a particular type of transaction;
storing, in a table corresponding to an initial key and a final key, counts of a plurality of elapsed times between previous transactions associated with the initial key and previous transactions associated with the final key, each elapsed time of the plurality of elapsed times corresponding to an elapsed time between one transaction associated with the initial key and one transaction associated with the final key;
determining, by a computer system, a likelihood of transactions associated with any key occurring within a time window after a first transaction associated with the initial key initiated by the consumer, the likelihood being determined based on a count of transactions associated with the table and having elapsed times corresponding to the time window; and
sending an incentive associated with a future transaction to the consumer based on the likelihood being less than a threshold.

18. The method of claim 17, wherein the determining of the likelihood of transactions associated with any key occurring within the time window after the first transaction is further based one or more counts of transactions having elapsed times corresponding to the time window in one or more additional tables, each of the one or more additional tables corresponding to the initial key and a different final key.

19. The method of claim 17, wherein the incentive is for a second merchant that is geographically near a first merchant involved in the first transaction.

20. The method of claim 17, wherein the future transaction is selected based on transactions conducted by a group of consumers within an affinity group including the consumer that occur after transactions associated with the initial key.

21. A computer system for providing an incentive to a consumer, the computer system comprising:
a processor; and
a non-transitory computer-readable storage medium comprising instructions executable by the processor for implementing a method comprising:
receiving data corresponding to previous transactions associated with the consumer, each of the previous transactions associated with one or more keys, and each of the one or more keys corresponding to a particular type of transaction;
storing, in a table corresponding to an initial key and a final key, counts of a plurality of elapsed times between previous transactions associated with the initial key and previous transactions associated with the final key, each elapsed time of the plurality of elapsed times corresponding to an elapsed time between one transaction associated with the initial key and one transaction associated with the final key;

determining a likelihood for a future transaction at each future time of a plurality of future times, the future transaction being associated with the final key, the likelihood for the future transaction at each particular future time being determined based on a count of elapsed times in the table corresponding to the particular future time;

predicting a time window when the consumer is likely to initiate the future transaction using the likelihoods at the plurality of future times; and sending an incentive associated with the future transaction to the consumer such that the consumer receives the incentive at a time within the predicted time window.

22. The computer system of claim 21, wherein the determining of the likelihood for the future transaction at each particular future time is further based on one or more counts of elapsed times corresponding to the particular future time in one or more additional tables, each of the one or more additional tables corresponding to the final key and a different initial key.

23. The computer system of claim 21, wherein the predicting of the time window when the consumer is likely to initiate the future transaction is further based on a first threshold, wherein a duration of the time window is variable, a start of the time window based on a first likelihood at a first future time being above the first threshold and an end of the time window based on a second likelihood at a second future time being below the first threshold.

24. The computer system of claim 23, wherein a start of the time window is at a specified amount of time relative to the first future time when the likelihood is above the first threshold.

25. The computer system of claim 21, wherein the method further comprises specifying specific values for categories associated with the future transaction, wherein the time window is when the consumer is likely to initiate the future transaction having the specified values, the categories including one or more of an account number, an amount of the transaction, a time and date, a type product or service, a merchant name or code, an industry code, a terminal field, and a geographic location.

26. The computer system of claim 21, wherein the method further comprises determining that the consumer is within an affinity group including one or more other consumers, wherein the time window when the consumer is likely to initiate the future transaction is based on likelihoods of the one or more other consumers initiating the future transaction.

27. The computer system of claim 21, wherein the method further comprises predicting a merchant at which the future transaction is to occur, wherein the incentive is for a first product that is available at the merchant, wherein the first product is a different product than a product predicted for the future transaction.

28. The computer system of claim 21, wherein the consumer receives the incentive during the time window.

29. The computer system of claim 21, wherein the incentive is sent at a predetermined time before the predicted time window.

30. The computer system of claim 21, wherein the incentive is valid only during the predicted time window.

31. The computer system of claim 21, wherein the method further comprises:

determining a cost associated with the sending of the incentive; and determining a benefit associated with the future transaction, wherein the sending of the incentive is based on the cost and the benefit.

32. The computer system of claim 21, wherein sending of the incentive includes sending an electronic message to the consumer, wherein the electronic message is selected from the group consisting of an SMS message, an MMS message, and an e-mail.

33. The computer system of claim 21, wherein the method further comprises determining a peak time of the plurality of future times where a particular likelihood is a maximum, wherein the time window is correlated to the peak time.

34. A computer system for providing an incentive to a consumer, the computer system comprising:

a processor; and a non-transitory computer-readable storage medium comprising instructions executable by the processor for implementing a method comprising:

receiving data corresponding to previous transactions associated with the consumer, each of the previous transactions being associated with one or more keys, and each of the one or more keys corresponding to a particular type of transaction;

storing, in a table corresponding to an initial key and a final key, counts of a plurality of elapsed times between previous transactions associated with the initial key and previous transactions associated with the final key, each elapsed time of the plurality of elapsed times corresponding to an elapsed time between one transaction associated with the initial key and one transaction associated with the final key;

determining, by a computer system, a likelihood of transactions associated with any key occurring within a time window after a first transaction associated with the initial key initiated by the consumer, the likelihood being determined based on a count of transactions associated with the table and having elapsed times corresponding to the time window; and sending an incentive associated with a future transaction to the consumer based on the likelihood being greater than a threshold.

35. The computer system of claim 34, wherein the determining of the likelihood of transactions associated with any key occurring within the time window after the first transaction is further based one or more counts of transactions having elapsed times corresponding to the time window in one or more additional tables, each of the one or more additional tables corresponding to the initial key and a different final key.

36. The computer system of claim 34, wherein the first transaction is with a first merchant, wherein the incentive is for a second merchant, and wherein transactions at the first merchant correlate to later transactions at the second merchant.

37. A computer system for providing an incentive to a consumer, the computer system comprising:

a processor; and a non-transitory computer-readable storage medium comprising instructions executable by the processor for implementing a method comprising:

receiving data corresponding to previous transactions associated with the consumer, each of the previous transactions being associated with one or more keys, and each of the one or more keys corresponding to a particular type of transaction;

storing, in a table corresponding to an initial key and a final key, counts of a plurality of elapsed times between previous transactions associated with the initial key and previous transactions associated with the final key, each elapsed time of the plurality of elapsed times corresponding to an elapsed time between one transaction associated with the initial key and one transaction associated with the final key;

determining, by a computer system, a likelihood of transactions associated with any key occurring within a time window after a first transaction associated with the initial key initiated by the consumer, the likelihood being determined based on a count of transactions associated with the table and having elapsed times corresponding to the time window; and sending an incentive associated with a future transaction to the consumer based on the likelihood being less than a threshold.

38. The computer system of claim 37, wherein the determining of the likelihood of transactions associated with any key occurring within the time window after the first transaction is further based one or more counts of transactions having elapsed times corresponding to the time window in one or more additional tables, each of the one or more additional tables corresponding to the initial key and a different final key.

39. The computer system of claim 37, wherein the incentive is for a second merchant that is geographically near a first merchant involved in the first transaction.

40. The computer system of claim 37, wherein the future transaction is selected based on transactions conducted by a group of consumers within an affinity group including the consumer that occur after transactions associated with the initial key.

* * * * *

UNITED STATES PATENT AND TRADEMARK OFFICE
CERTIFICATE OF CORRECTION

| | |
|---|---|
| PATENT NO. | : 9,984,379 B2 |
| APPLICATION NO. | : 15/635543 |
| DATED | : May 29, 2018 |
| INVENTOR(S) | : Patrick Faith and Kevin P. Siegel |

Page 1 of 1

It is certified that error appears in the above-identified patent and that said Letters Patent is hereby corrected as shown below:

In the Claims

In Column 30, Line 34 please remove "determining, by a computer" and insert --determining, by the computer--

In Column 31, Line 9 please remove "determining, by a computer" and insert --determining, by the computer--

Signed and Sealed this
Second Day of October, 2018

Andrei Iancu
*Director of the United States Patent and Trademark Office*